(12) United States Patent
Hagiwara

(10) Patent No.: US 10,279,833 B2
(45) Date of Patent: May 7, 2019

(54) CAM DEVICE AND POSITION ADJUSTMENT DEVICE FOR STEERING WHEEL

(71) Applicant: NSK LTD., Tokyo (JP)

(72) Inventor: Seiichi Hagiwara, Maebashi (JP)

(73) Assignee: NSK LTD., Tokyo (JP)

(*) Notice: Subject to any disclaimer, the term of this patent is extended or adjusted under 35 U.S.C. 154(b) by 32 days.

(21) Appl. No.: 15/527,863

(22) PCT Filed: Jan. 13, 2016

(86) PCT No.: PCT/JP2016/050891
§ 371 (c)(1),
(2) Date: May 18, 2017

(87) PCT Pub. No.: WO2016/114327
PCT Pub. Date: Jul. 21, 2016

(65) Prior Publication Data
US 2018/0346011 A1 Dec. 6, 2018

(30) Foreign Application Priority Data
Jan. 13, 2015 (JP) .................................. 2015-004540

(51) Int. Cl.
*B62D 1/184* (2006.01)
*B62D 1/187* (2006.01)
(Continued)

(52) U.S. Cl.
CPC ............. *B62D 1/184* (2013.01); *B62D 1/187* (2013.01); *F16B 7/1427* (2013.01);
(Continued)

(58) Field of Classification Search
CPC ........ B62D 1/184; B62D 1/187; B62D 1/195; F16B 7/1427
See application file for complete search history.

(56) References Cited

U.S. PATENT DOCUMENTS 7,717,011 B2 * 5/2010 Hirooka ................. B62D 1/184
280/777
9,150,241 B2 * 10/2015 Nakazato ............... B62D 1/187
(Continued)

FOREIGN PATENT DOCUMENTS

JP     2002087286     3/2002
JP     2009227181     10/2009
(Continued)

OTHER PUBLICATIONS

International Search Report, PCT/JP2016/050891 filed Jan. 13, 2016.

*Primary Examiner* — James A English
(74) *Attorney, Agent, or Firm* — Hartman Global IP Law; Gary M. Hartman; Domenica N. S. Hartman

(57) ABSTRACT

Construction is achieved of a cam device that is able to effectively prevent a drive-side cam from rotating relative to a driven-side cam in a locked state. Tip-end butt sections 63 are provided on the outer-diameter side portions of tip-end surfaces 41a (40a) of convex sections of one of drive-side convex sections 34a of the drive-side cam surface 31a and driven-side convex sections 36a of the driven-side cam surface 32a, and tip-end concave sections 64 that are further recessed in the axial direction than the tip-end butt sections 63 are provided on the inner-diameter side portions of the one convex sections. In the locked state, only the tip-end butt sections 63 come in contact with the tip-end surfaces 40a (41a) of the other convex sections of the drive-side convex sections 34a and the driven-side convex section 36a.

6 Claims, 13 Drawing Sheets

(51) Int. Cl.
*F16H 25/12* (2006.01)
*F16H 35/18* (2006.01)
*F16B 7/14* (2006.01)
*B62D 1/19* (2006.01)

(52) U.S. Cl.
CPC ........... *F16H 25/125* (2013.01); *F16H 35/18* (2013.01); *B62D 1/195* (2013.01)

(56) References Cited

U.S. PATENT DOCUMENTS

| | | | |
|---|---|---|---|
| 9,290,197 B2 * | 3/2016 | Kern | B62D 1/187 |
| 2002/0023515 A1 * | 2/2002 | Kuroumaru | B62D 1/184 |
| | | | 74/493 |
| 2009/0241721 A1 | 10/2009 | Inoue et al. | |
| 2012/0312117 A1 * | 12/2012 | Maniwa | B62D 1/184 |
| | | | 74/493 |
| 2013/0247708 A1 * | 9/2013 | Hirooka | B62D 1/184 |
| | | | 74/493 |
| 2015/0068353 A1 * | 3/2015 | Mihara | B62D 1/184 |
| | | | 74/493 |
| 2016/0297463 A1 * | 10/2016 | Tomaru | B62D 1/184 |
| 2017/0066468 A1 * | 3/2017 | Tomiyama | B62D 1/184 |
| 2017/0072986 A1 * | 3/2017 | Ishii | B62D 1/189 |
| 2017/0240198 A1 * | 8/2017 | Maniwa | B62D 1/184 |

FOREIGN PATENT DOCUMENTS

| | | | | |
|---|---|---|---|---|
| JP | 2014-104862 | | 6/2014 | |
| WO | WO-2014084262 A1 * | | 6/2014 | ............ B62D 1/184 |

* cited by examiner

LOCKING DIRECTION

LOCKING DIRECTION

LOCKING DIRECTION

LOCKING DIRECTION

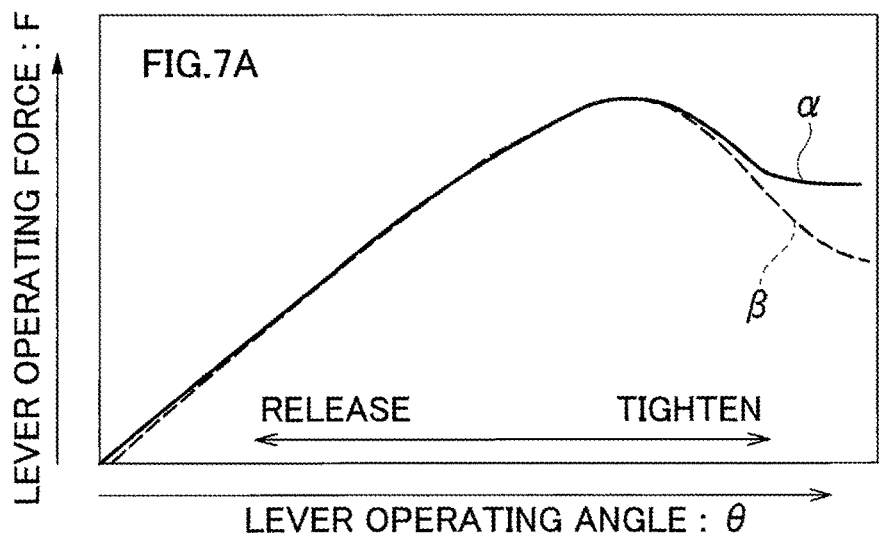
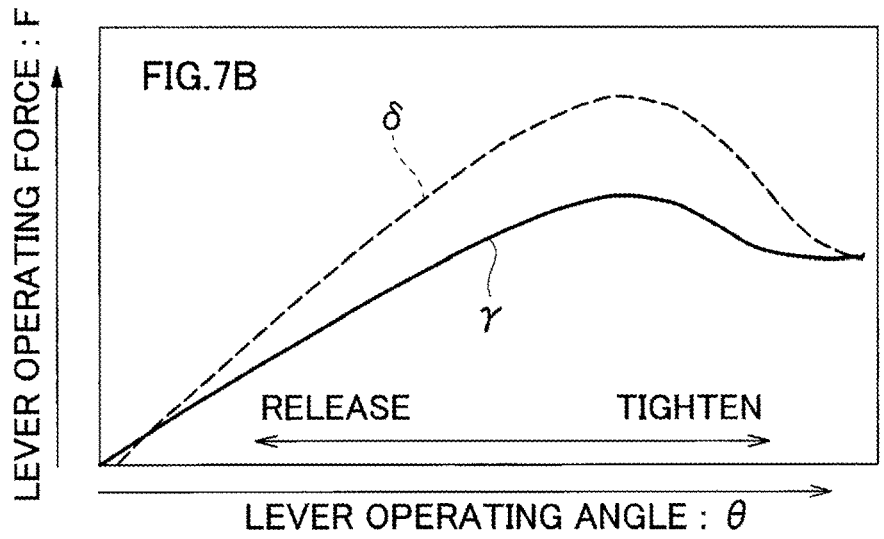
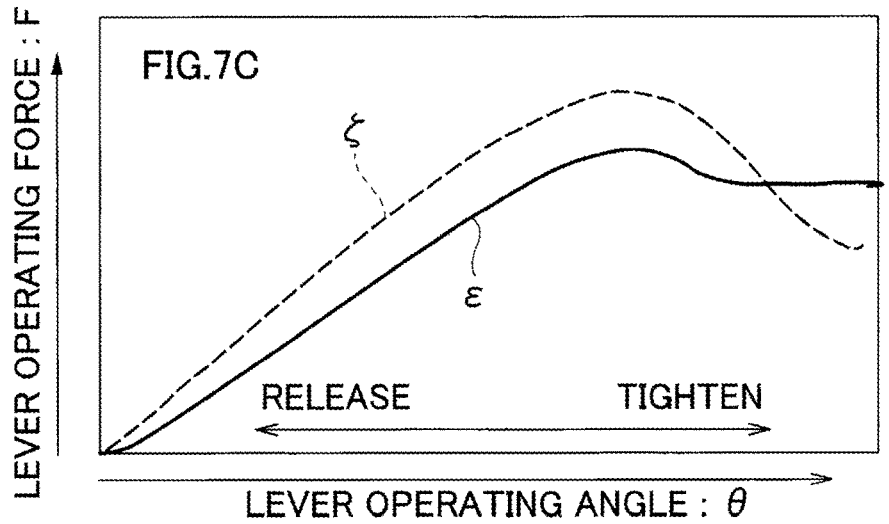

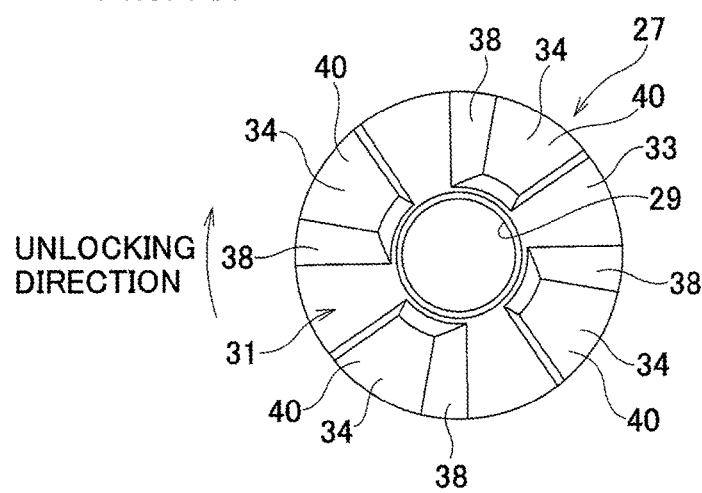
FIG. 11A
Prior Art
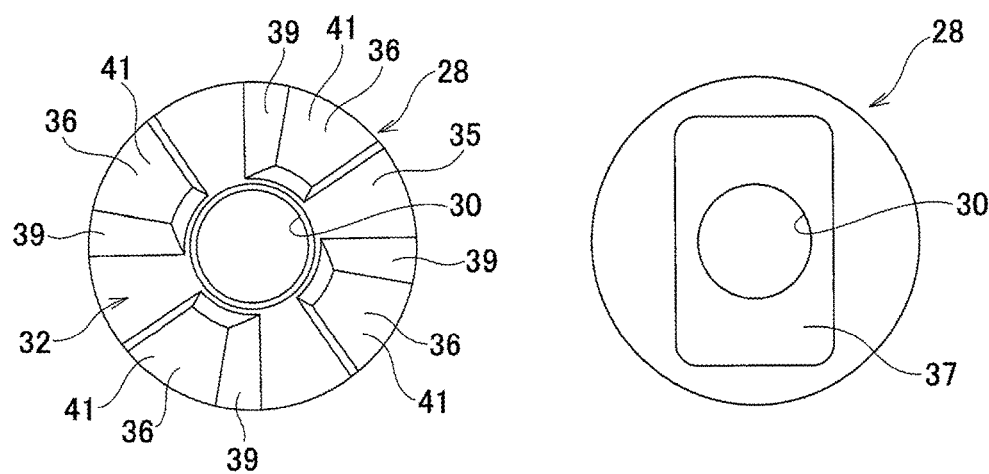
FIG. 11B
Prior Art
FIG. 11C
Prior Art

CAM DEVICE AND POSITION ADJUSTMENT DEVICE FOR STEERING WHEEL

TECHNICAL FIELD

The present invention relates to a cam device that is assembled in and used in a position adjustment device for a steering wheel of an automobile, and to a steering wheel position adjustment device in which that cam device is assembled.

BACKGROUND ART

An automobile steering device is configured as illustrated in FIG. 8, and is such that the rotation of a steering wheel 1 is transmitted to an input shaft 3 of a steering-gear unit 2, and as the input shaft 3 rotates, a pair of tie rods 4 are pushed and pulled, which applies a steering angle to the front wheels. The steering wheel 1 is supported by and fastened to the rear-end section of a steering shaft 5, and the steering shaft 5 is passed in the axial direction through a cylindrical shaped steering column 6, and in this state, is rotatably supported by the steering column 6. The front-end section of the steering shaft 5 is connected to the rear-end section of an intermediate shaft 8 by way of a universal joint 7, and the front-end section of the intermediate shaft 8 is connected to the input shaft 3 by way of another universal joint 9.

A steering wheel position adjustment device that includes a tilt mechanism for adjusting the up-down position of the steering wheel 1 according to the stature and driving posture of the driver, and/or a telescopic mechanism for adjusting the forward-backward position of the steering wheel 1 is assembled in the steering device for an automobile (refer to JP2009227181 (A)). In order to construct the tilt mechanism, a housing 10 is fastened to the front-end section of the steering column 6, and the front-end section of the upper portion of the housing 10 is supported by the vehicle body 11 by a tilt shaft 12 that is arranged in the width direction so as to be able to pivotally displace. In this specification, the width direction means the width direction of the vehicle, and coincides with the left-right direction of the vehicle. A displacement bracket 13 is provided on the bottom surface of the middle section in the axial direction of the steering column 6, and a support bracket 14 is provided in a state so as to sandwich the displacement bracket 13 on both sides in the width direction. A pair of long tilt holes 15 that extend in the up-down direction are formed in the support bracket 14, and through holes 16 are formed in portions of the displacement bracket 13 that are aligned with part of the long tilt holes 15. In the example in the FIG. 8, in order to construct the telescopic mechanism, the through holes 16 are constructed by long holes (long telescopic holes) that extend in the forward-backward direction. Moreover, the steering shaft 5 and the steering column 6 are configured so as to be able to extend and contract. A rod-shaped member 17 is provided that passes in the width direction through the long tilt holes 15 and the through holes 16. By adjusting the force by which the support bracket 14 holds the displacement bracket 13 on both sides in the width direction by operating an adjustment lever that is provided on one end section of the rod-shaped member 17, the state can be switched between a state in which the position of the steering wheel 1 can be adjusted and a state in which the position is locked.

FIG. 9 and FIG. 10 illustrate an example of a steering device that includes a steering wheel position adjustment device. The steering column 6 is configured such that the overall length can expand and contract by the front end section of an outer column 18 that is arranged on the rear side fitting with the rear section of an inner column 19 that is arranged on the front so as to be able to slide. The outer column 18 is made by die-casting a light alloy. By providing a slit 20 in the front section of the outer column 18, the inner diameter of the front section of the outer column 18 is able to elastically expand and contract. A pair of held plate sections 21 of the displacement bracket 13 are provided in portions of the outer circumferential surface of the outer column 18 located on both sides in the left-right direction of the slit 20. Through holes 16 (long telescopic holes) are formed in the pair of held plate sections 21. A pair of support-plate sections 22 of the support bracket 14 are arranged so as to hold the displacement bracket 13 from both sides in the left-right direction. Long tilt holes 15 having a partial circular arc shape that is centered around a tilt shaft 12 (refer to FIG. 8) are formed in the pair of support-plate sections 22. The rod-shaped member 17 is inserted in the width direction through the long tilt holes 15 and the through holes 16.

An adjustment lever 23 that is provided on one end section in the axial direction of the rod-shaped member 17, an anchor section 24 that is provided on the other end section in the axial direction of the rod-shaped member 17, and a cam device 25 that is provided in a portion near one end in the axial direction of the rod-shaped member 17 form a tilt locking mechanism that expands or contracts a space between the inside surfaces of the pair of support-plate sections 22 based on pivoting of the adjustment lever 23. The anchor section 24 has a shape like the head section of a bolt and is provided on the other end section in the axial direction of the rod-shaped member 17, and a pair of engaging convex sections 26 that are formed on the inside surface of the anchor section 24 engage with the long tilt hole 15 that is formed in the other support-plate section 22 (right one in FIG. 10) of the pair of support-plate sections 22 that faces the inside surface of the anchor section 24 so that displacement is only possible along the long tilt holes 15. Therefore, the rod-shaped member 17 is able to move up or down along the pair of long tilt holes 15, however, does not rotate around the center axis of the rod-shaped member 17.

As illustrated in FIG. 11, a cam device 25 in which a drive-side cam 27 and a driven-side cam 28 are combined, is assembled in the steering wheel position adjustment device. The drive-side cam 27 is formed into a circular ring plate shape as a whole and has a center hole 29 for inserting the rod-shaped member 17 through, and the driven-side cam 28 is formed into a circular ring plate shape as a whole and has a center hole 30 for inserting the rod-shaped member 17 through. A drive-side cam surface 31 and a driven-side cam surface 32, which are uneven surfaces in the circumferential direction are formed on the surfaces of drive-side cam 27 and the driven-side cam 28 that face each other. The drive-side cam surface 31 that is provided on the inside surface of the drive-side cam 27 includes a flat drive-side base surface 33 and plural drive-side convex sections 34 that protrude inward in the width direction from plural evenly spaced locations in the circumferential direction of the drive-side base surface 33. The driven-side cam surface 32 that is provided on the outside surface of the driven-side cam 28 includes a flat driven-side base surface 35, and plural driven-side convex sections 36 that protrude outward in the width direction from plural evenly spaced locations in the circumferential direction of the driven-side base surface 35. A second engaging convex section 37 is formed on the inside surface of the driven-side cam 28.

The second engaging convex section 37 of the driven-side cam 28 engages with the long tilt hole 15 that is formed in the one support-plate section 22 (one on the left side in FIG. 10) of the pair of support-plate sections 22 that faces the inside surface of the driven-side cam 28 so that only displacement along the long tilt holes 15 is possible. Therefore, the driven-side cam 28 is able to move up or down along the long tilt holes 15, however, does not rotate centered around the shaft of the driven-side cam 28. The base-end section of an adjustment lever 23 is joined and fastened to the drive-side cam 27, and the drive-side cam 27 is configured so as to rotate back-and-forth around the rod-shaped member 17 as the adjustment lever 23 is pivoted back-and-forth.

When adjusting the position of the steering wheel 1, the adjustment lever 23 is pivoted in a specified direction (typically downward), which rotates the drive-side cam 27 in the unlocking direction (right direction in FIG. 12), which is the direction of rotation when switching to the unlocked state, and as illustrated in FIG. 12A, by arranging the drive-side convex sections 34 and the driven-side convex sections 36 so as to alternate in the circumferential direction, the dimension in the axial direction of the cam device 25 is contracted and the unlocked state is set, and the space between the driven side cam 28 and the anchor section 24 is expanded. As a result, the surface pressure at the areas of contact between the inside surfaces of the pair of support-plate sections 22 and the outside surfaces of the pair of held plate sections 21 decreases or is lost, the inner diameter of the front-end section of the outer column 18 elastically expands, and the surface pressure at the area of contact between the inner-circumferential surface on the front-end section of the outer column 18 and the outer-circumferential surface of the rear-end section of the inner column 19 decreases. In this state, the up-down position and the forward-backward position of the steering wheel 1 can be adjusted within the range that the rod-shaped member 17 can move inside the long tilt holes 15 and the through holes 16.

In order to maintain the steering wheel 1 at a desired position, the adjustment lever 23 is pivoted in the opposite direction (typically upward) after the steering wheel 1 has been moved to the desired position, which rotates the drive-side cam 27 in the locking direction (left direction in FIG. 12), which is the direction of rotation when switching to the locked state. As illustrated in FIG. 12B, when the drive-side cam 27 is rotated in the locking direction, drive-side inclined guiding surfaces 38 that are located on the front side in the locking direction of both side surfaces in the circumferential direction of the drive-side convex sections 34 that are formed on the drive-side cam surface 31 slide along and are guided by driven-side inclined guiding surfaces 39 that are located on the rear side in the locking direction of both side surfaces in the circumferential direction of the driven-side convex sections 36 that are formed on the driven-side cam surface 32, and go up the driven-side inclined guiding surfaces 39. As a result, as illustrated in FIG. 12C, the flat tip-end surfaces 40 of the drive-side convex sections 34 and the flat tip-end surfaces 41 of the driven-side convex sections 36 come in contact with each others, the dimension in the axial direction of the cam device 25 expands and the locked state is set, and the space between the inside surface of the pair of support-plate sections 22 decreases. Consequently, the surface pressure at the areas of contact between the inside surfaces of the pair of support-plate sections 22 and the outside-surfaces of the pair of held plate sections 21 increases, the inner diameter of the front-end section of the outer column 18 elastically contracts, the surface pressure at the area of contact between the inner-circumferential surface of the front-end section of the outer column 18 and the outer-circumferential surface of the rear-end section of the inner column 19 increases, and the steering wheel 1 is held at the adjusted desired position.

In a steering wheel position adjustment device in which a cam device 25 such as described above is assembled, in the locked state the drive-side cam 27 and the driven-side cam 28 rotate relative to each comparatively easily, and there is a possibility that a problem will occur in that the locked state will easily become released when an impact is mistakenly applied to the adjustment lever 23.

JP2002087286 (A) describes construction in which by forming gradient sections on the tip-end surface of drive-side convex sections that are provided on a drive-side cam, such that the gradient sections are inclined in the opposite direction from drive-side inclined guiding surfaces that are formed on the side surfaces in the circumferential direction of the drive-side convex sections, it becomes difficult for the drive-side cam to rotate relative to the driven-side cam in the unlocking direction. However, in the case of the construction described in JP2002087286 (A), the gradient sections wear after use over a long period of time, and there is a possibility that the gradient sections will not be able to effectively prevent relative rotation between the drive-side cam and the driven-side cam, and there is a possibility that the operating force of the adjustment lever when the tip-end surfaces of the driven-side convex sections ride up on top of the gradient sections will become too large, and operability of the adjustment lever will decrease.

RELATED LITERATURE

Patent Literature

[Patent Literature 1] JP2009227181 (A)
[Patent Literature 2] JP2002087286 (A)

SUMMARY OF INVENTION

Problem to be Solved by Invention

Taking the situation described above into consideration, the object of the present invention is to achieve construction of a cam device that is able to effectively prevent the drive-side came from rotating relative to the driven-side cam in the locked state, and that is able to make operation of the adjustment lever for operating the cam device smooth.

Means for Solving Problems

The cam device of the present invention includes a drive-side cam that is rotatably supported, and a driven-side cam that is unrotatably supported.

The drive-side cam has a circular ring plate shape, for example, and includes a drive-side cam surface that is an uneven surface in the circumferential direction of the cam device and that is provided on one side surface in the axial direction of the cam device. The drive-side cam surface has a drive-side base surface, and plural drive-side convex sections that are provided so as to protrude toward one side in the axial direction from plural locations in the circumferential direction of the drive-side base surface and the drive-side convex sections have plural drive-side inclined guiding surfaces that are provided on one side surface in the circumferential direction.

The driven-side cam has a circular ring plate shape or a rectangular plate shape, for example, and includes a driven-side cam surface that is an uneven surface in the circumferential direction and is provided on the other side surface in the axial direction that faces the drive-side cam surface. The driven-side cam surface has a driven-side base surface, and plural driven-side convex sections, preferably the same number driven-side convex sections as the number of drive-side convex sections, that are provided so as to protrude toward the other side in the axial direction from plural locations in the circumferential direction of the driven-side base surface, and the driven-side convex sections have plural driven-side inclined guiding surfaces that are provided on the other side surface in the circumferential direction. The driven-side cam is supported so as not to be able to rotate by an opposing member such as a support bracket or friction plate that faces to the driven-side cam. In order for this, an engaging convex section that engages with the opposing member is provided, for example, on one side in the axial direction of the driven-side cam.

The cam device can switch by rotating the drive-side cam relative to the driven-side cam, from a unlocked state in which the dimension in the axial direction of the cam device is contracted by alternatingly arranging the drive-side convex sections and the driven-side convex sections in the circumferential direction, to a locked state in which the dimension in the axial direction of the cam device is expanded by bringing the tip-end surfaces (top surfaces) of the drive-side convex sections in contact with the tip-end surfaces (top surfaces) of the driven-side convex sections, through a state in which the drive-side inclined guiding surfaces slide over the driven-side inclined guiding surfaces.

Particularly, the cam device of the present invention is provided with tip-end butt sections on the outer-diameter side portions, for example the outer half sections in the radial direction, of convex sections of one cam of the drive-side cam and the driven side cam, and tip-end concave sections that are further recessed in the axial direction than the tip-end butt sections on the inner diameter side portions, for example the inner half sections in the radial direction, of the one convex sections of the one cam.

Preferably, inclined sliding sections are provided on the inner-diameter side portions of the inclined guiding surfaces (one inclined guiding surfaces of the drive-side inclined guiding surfaces and the driven-side inclined guiding surfaces) of the convex sections of the one cam (one convex sections of the drive-side convex sections and the driven-side convex sections), and inclined concave sections that are further recessed in the axial direction than the inclined sliding sections are provided on the outer-diameter side portions of the inclined guiding surfaces of the convex sections of the one cam, and the tip-end butt sections are provide further on the outside in the radial direction than the inclined sliding sections.

Preferably, the inclined sliding sections and the tip-end butt sections are provided in a continuous state.

Preferably, by providing a notch section that is recessed inward in the radial direction on a portion in at least one location in the circumferential direction of the outer peripheral edge section of the one cam, the portion including one of the inclined concave sections with regard to the circumferential direction, and by providing a convex stopper section that protrudes in the axial direction on a portion in at least one location in the circumferential direction of the outer-diameter side portion of the cam surface of the other cam of the drive-side cam and the driven-side cam (one cam surface of the drive-side cam surface and the driven-side cam surface), the portion being aligned with one of the other convex sections with regard to the circumferential direction, the cam device is configured so that in the locked state, one side surface in the circumferential direction of the notch section and the other side surface in the circumferential direction of the convex stopper section come in contact and the drive-side cam is prevented from rotating any further in the locking direction that is the direction of rotation of the drive-side cam when switching to the locked state.

The steering wheel position adjustment device of the present invention includes a steering column, a displacement bracket, a support bracket, a pair of long tilt holes, a through hole, a rod-shaped member, an anchor section, a pressure section and a cam device.

The steering column is able to pivotally displace centered around a tilt shaft that is arranged in the width direction.

A steering shaft is rotatably supported on the inside of the steering column. A steering wheel is fastened to a portion of the steering shaft that protrudes from an opening on the end section of the steering column.

The displacement bracket is provided in the middle section in the axial direction of the steering column.

The support bracket has a pair of support-plate sections that hold the displacement bracket, and is supported by a vehicle body.

The pair of long tilt holes are provided in portions of the pair of support-plate sections that are aligned with each other, and have, for example, a partial arc shape that is centered around the tilt shaft, or has a straight shape in the tangential direction of an arc centered around the tilt shaft, the pair of long tilt holes extending in the up-down direction.

The through hole is, for example, a circular hole or a long hole that extends in the forward-backward direction, and is formed in a portion of the displacement bracket that are aligned with part of the pair of long tilt holes so as to pass through in the width direction.

The rod-shaped member is inserted in the width direction through the long tilt holes and the through hole.

The pressure section is provided on one end of the rod-shaped member in a portion that protrudes from the outside surface of one support-plate section of the pair of support-plate sections.

The anchor section is provided on the other end of the rod-shaped member in a portion that protrudes from the outside surface of the other support-plate section of the pair of support-plate sections.

The cam device expands or contracts a space between the anchor section and the pressure section.

In the case of the steering wheel position adjustment device of the present invention, the cam device of the present invention is used as the cam device, and the driven-side cam functions as the pressure section. The drive-side cam of the cam device is supported by the one end section of the rod-shaped member so as to be able to rotate centered around the rod-shaped member, and in a state such that the displacement toward the one-end side of the rod-shaped member is suppressed. A thrust bearing is provided around the rod-shaped member between a rotating member that rotates in synchronization with the drive-side cam or the driven-side cam, and a non-rotating member that is provided in a position facing the rotating member with regard to the axial direction of the rod-shaped member. The drive-side cam is fitted around the outside of the rod-shaped member so as to be able to rotate relative to the rod-shaped member, or so as to be able to rotate in synchronization with the rod-shaped member.

Effect of Invention

With the cam device and steering wheel position adjustment device of the present invention, in the locked state, it is possible to effectively prevent the drive-side cam from rotating relative to the driven-side cam, and it is possible to make the operating force of the adjustment lever smooth. In other words, tip-end butt sections are provided on the outer-diameter side portions of tip-end surfaces of convex sections of one cam of the drive-side cam and the driven-side cam, and tip-end concave sections that are further recessed in the axial direction than the tip-end butt sections are provided on the inner-diameter side portions of the tip-end surfaces of the convex sections of the one cam. Therefore, in the locked state, only the tip-end butt sections that are provided on the outer-diameter side portions of the tip-end surface of the convex sections of the one cam come in contact with the tip-end surfaces of the convex sections of the other cam of the drive-side cam and the driven-side cam, and the tip-end concave sections that are provided on the inner-diameter side portions of the convex section of the one cam do not come in contact with the tip-end surface of the convex sections of the other cam. Consequently, the cam device of the present invention is such that in the locked state, when the drive-side cam tries to rotate relative to the driven-side cam, the distance between the point where a friction force that occurs between the tip-end surfaces of the drive-side convex sections and the tip-end surfaces of the driven-side convex sections acts, and the center of rotation of the drive-side cam can be made to be larger than in the case of the conventional construction illustrated in FIG. 11. In this way, when rotating the drive-side cam relative to the unlocking direction, the moment force that acts on the drive-side cam in the direction preventing relative rotation can be increased. As a result, in the locked state, it is possible to effectively prevent the drive-side cam from rotating in the unlocking direction relative to the driven-side cam without impairing the operating force of the adjustment lever.

BRIEF DESCRIPTION OF DRAWINGS

FIGS. 7A to 7C are graphs illustrating the results of simulation that was performed for checking the effect of the present invention; where FIG. 7A illustrates the difference between the present invention and conventional construction depending on whether or not there is a tip-end concave section; FIG. 7B illustrates the difference between the present invention and conventional construction depending on whether or not there is an inclined concave section; and FIG. 7C illustrates the difference between the present invention and conventional construction depending on whether or not there is a tip-end concave section and inclined concave section.

FIG. 11A is a schematic view of the drive-side cam of a cam device having conventional construction as seen from the front; FIG. 11B is a schematic view of the driven-side cam as seen from the front; and FIG. 11C is a schematic view of the driven-side cam as seen from the rear.

MODES FOR CARRYING OUT INVENTION

Figure 1:
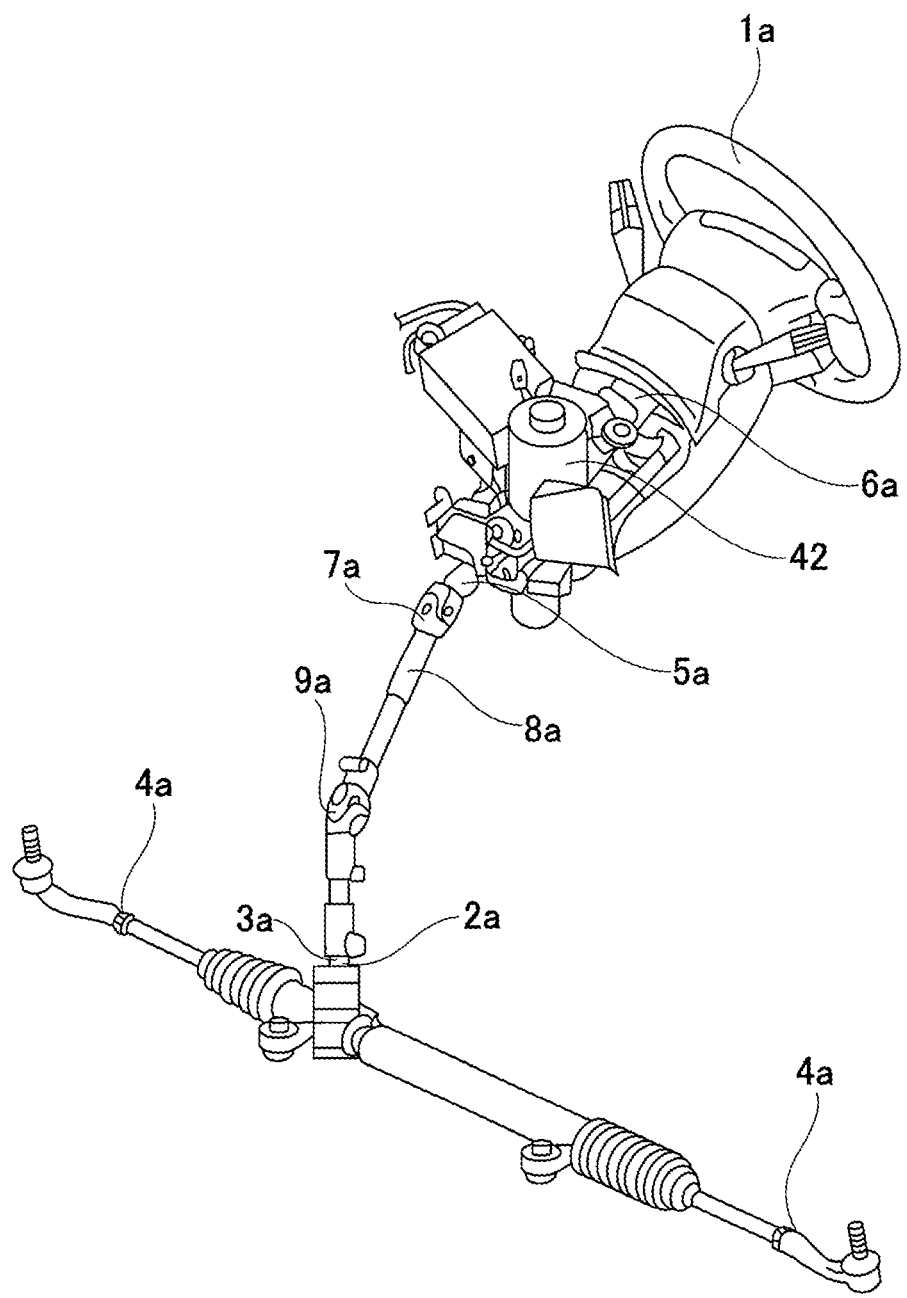
FIG. 1 is a perspective view that schematically illustrates a steering device in which an example of an embodiment of the steering wheel position adjustment device of the present invention is assembled.
Figure 2:
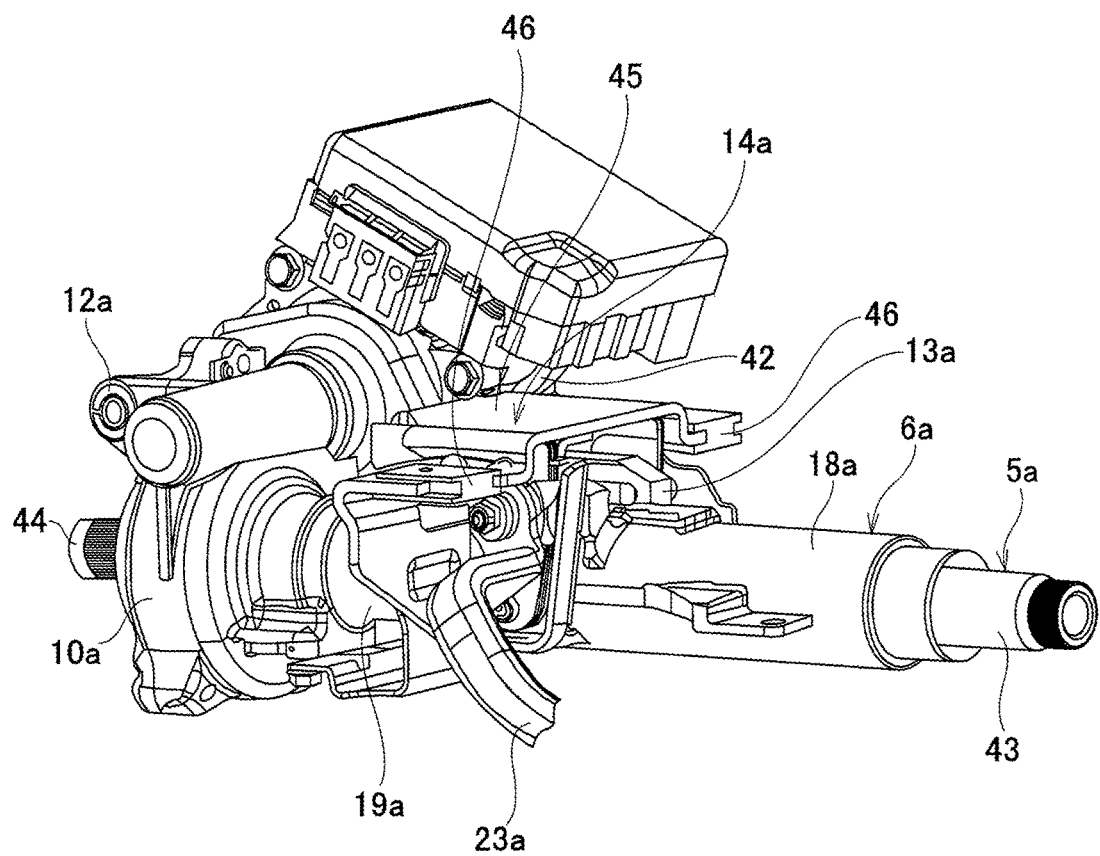
FIG. 2 is a perspective view of an embodiment of the steering wheel position adjustment device of the present invention.
Figure 3:
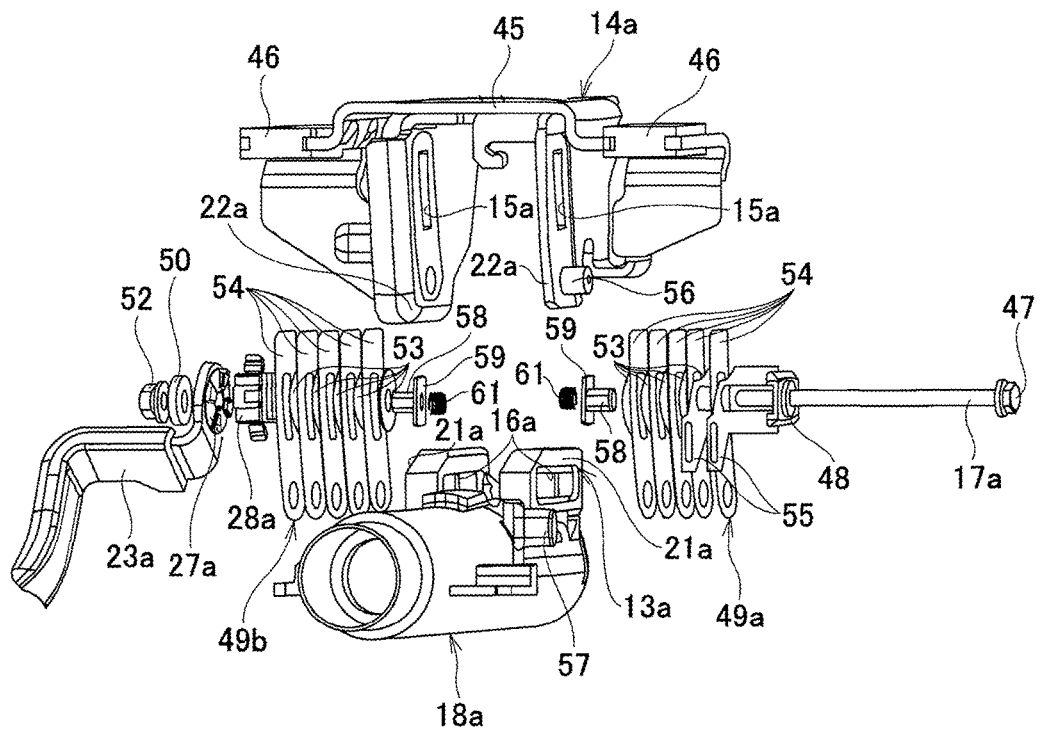
FIG. 3 is an exploded perspective view of the steering wheel position adjustment device illustrated in FIG. 2.
Figure 4:
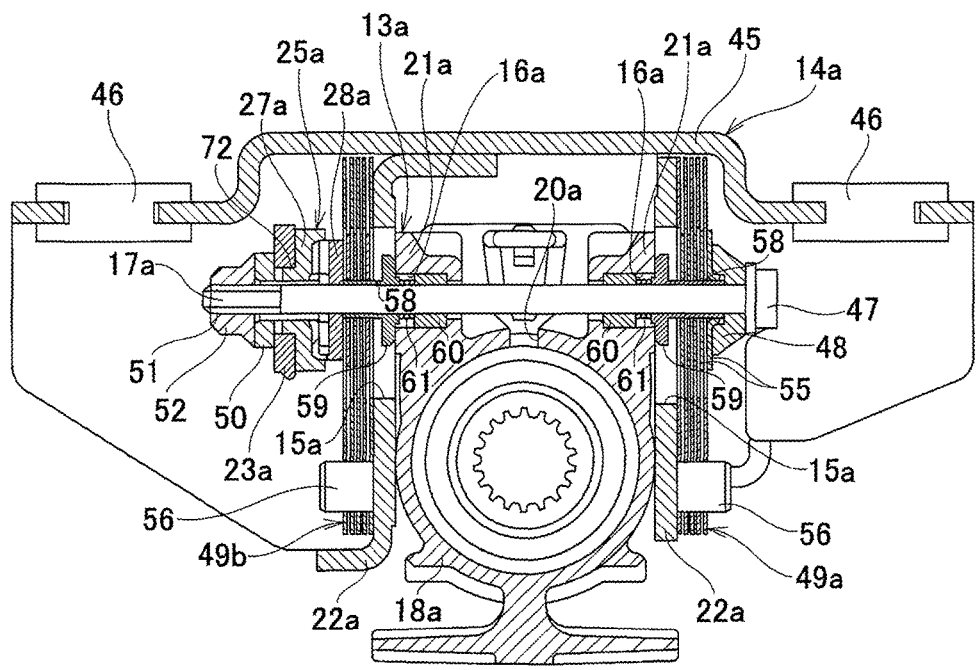
FIG. 4 is a cross-sectional view corresponding to FIG. 10 of the steering wheel position adjustment device illustrated in FIG. 2.

FIG. 1 to FIG. 7C illustrate an example of an embodiment of the present invention. As the steering wheel 1a rotates, the rotation of the steering wheel 1a is transmitted to the input shaft 3a of a steering gear unit 2a, and as the input shaft 3a rotates, a pair of left and right tie rods 4a is pushed and pulled by a rack-and-pinion mechanism, which applies a steering angle to the front wheels.

The steering wheel 1a is supported by and fastened to the rear-end section of a steering shaft 5a, and the steering shaft 5a is rotatably supported by a cylindrical shaped steering column 6a with being inserted in the axial direction through the steering column 6a. The front-end section of the steering shaft 5a is connected to the rear-end section of an intermediate shaft 8a by way of a universal joint 7a, and the intermediate shaft 8a is connected to the input shaft 3a by way of another universal joint 9a. An electric motor 42, as a power source for applying a steering assist force, is provided on the steering shaft 5a.

The steering shaft 5a is configured so as to be able to transmit torque and so as to be able to expand and contract in the axial direction by the front-end section of an outer shaft 43 on the rear side (right side in FIG. 2) fitting with the rear-end section of an inner shaft 44 on the front side (left side in FIG. 2) with a spline fit. The steering shaft 5a is only rotatably supported by a rolling bearing such as a single-row deep-groove rolling bearing on the inside of the steering column 6a in which an outer column 18a and inner column 19a are combined so as to be able to expand and contract.

A housing 10a is fastened to the front-end section of the inner column 19 on the front side of the steering column 6a, and the front-end section of the upper portion of the housing 10a is supported by the vehicle body by a tilt shaft 12a that is arranged in the width direction so as to be to pivotally displace. A worm speed reducer of an electric powered assist mechanism that includes a worm and a worm wheel is housed inside the housing 10a. The electric powered assist mechanism is configured so as to apply a steering assist force to the steering shaft 5a by rotating and driving the worm by an electric motor 42 that is fastened to the housing 10a according to torque that acts on the inner shaft 42.

A mechanism that is able to adjust the up-down position of the steering wheel 1a is configured by supporting the front-end section of the upper portion of the housing 10a so as to be able to pivotally displace around the tilt shaft 12a, and a mechanism that is able to adjust the forward-backward position of the steering wheel 1a is configured by the steering shaft 5a and the steering column 6a that are able to extend and contract. In order to maintain the steering wheel 1a at the adjusted position, a displacement bracket 13a is fastened to part of the steering column 6a, and a support bracket 14a is supported by the vehicle side. Moreover, a slit 20a that extends in the forward-backward direction is provided on the top-end section of the front section of the outer column 18a, and the inner diameter of the front section of the outer column 18a is able to elastically expand and contract. A pair of held plate sections 21a of the displacement bracket 13a are provided on portions of the outer-circumferential surface of the outer column 18 on both the right and left sides of the slit 20a. Through holes (long telescopic holes) 16a that extend in the forward-backward direction are provided in the pair of held plate sections 21a. When a telescopic mechanism is omitted, the through holes 16a are constructed by circular holes 16a.

The support bracket 14a is provided so as to sandwich the displacement bracket 13a on both sides in the width direction. The support bracket 14a includes an installation plate 45 that is provided on a upper part of the support bracket 14a and a pair of left and right support-plate sections 22a that hang downward from the installation plate 45. A pair of cut-out grooves that are open on the rear-end edge are formed in both end sections in the width direction of the installation plate 45, and the support bracket 14a is supported on the vehicle body with being engaged with the pair of cut-out grooves so as to be able to detach in the forward direction during a secondary collision by a pair of detachment members 46 that are fastened to the vehicle by joining members such as bolts, studs or the like. A pair of long tilt holes 15a that are partially arc shaped centered around the tilt shaft 12a are formed in portions of the pair of support-plate sections 22a that are aligned with each other, the pair of long tilt holes 15a extending in the up-down direction.

A rod-shaped member 17a is inserted in the width direction through the long tilt holes 15a and though holes 16a. On a portion on one end side in the axial direction of the rod-shaped member 17a that protrudes from one support-plate section 22a (left one in FIG. 4) of the pair of support-plate sections 22a, a friction assembly 49b, a driven-side cam 28a, a drive-side cam 27a, an adjustment lever 23a, and a thrust bearing 5 are arranged in order from the side of the one support-plate section 22a. A rectangular pressure plate 48 of the anchor section and a friction assembly 49a are arranged between a head section 47 that is provided on the other end section in the axial direction of the rod-shaped member 17a and the other support-plate section 22a (right one in FIG. 4) of the pair of support-plate sections 22a. A nut 52 is screwed onto a male threaded section 51 that is formed on one end section in the axial direction of the rod-shaped member 17a.

The rectangular pressure plate 48 is prevented from rotating relative to a telescoping friction plate 55 and from displacing in the up-down direction by the inside surface of the rectangular pressure plate 48 engaging with a pair of bent sections of the telescoping friction plate 55 of the friction assembly 49a that are formed by bending both the top and bottom edge sections of a long hole that is formed in this telescoping friction plate 55 outward in the width direction.

The pair of friction assemblies 49a, 49b are each configured by layering plural kinds of friction plates. The friction assembly 49a that is arranged between the other support-plate section 22a and the rectangular pressure section 48 is configured by layering three kinds of friction plates: circular ring friction plates 53, tilt friction plates 54 and telescoping friction plates 55. On the other hand, the friction assembly 49b that is arranged between the one support-plate section 22a and the driven-side cam 28a is configured by layering two kinds of friction plates: circular ring friction plates 53, and tilt friction plates 54.

The circular ring friction plates 53 are formed entirely into a circular ring shape and have a through hole in the center section for inserting the rod-shaped member 17a through.

The tilt friction plates 54 are formed so as to extend in the up-down direction, in each of which a long hole that extends in the up-down direction for inserting the rod-shaped member 17a through is formed in the middle section in the up-down direction, and a circular installation hole is formed in the bottom-end section. The tilt friction plates 54 are supported by the support bracket 14a by inserting fastening pins 56 that are provided so as to protrude in the width direction of the outside surfaces of the pair of support-plate sections 22a into the installation holes.

The telescoping friction plates 55 are formed so as to extend in the forward-backward direction, in each of which a long hole that extends in the forward-backward direction for inserting the rod-shaped member 17a through is formed in the middle section in the forward-backward direction, and an installation hole that is a long hole that extends in the up-down direction is formed in the rear-end section. The telescoping friction plates 55 are supported by the outer column 18a by inserting a fastening pin 57 that is provided so as to protrude in the width direction of the outside surfaces of the other held plate section 21a (right one in FIG. 4) of the pair of held plate sections 21a into the installation holes. The telescoping friction plates 55 are arranged so as to hold one tilt friction plate 54 that is arranged furthest on the outside from both sides in the width direction. A pair of bent sections for engaging with the rectangular pressure plate 48 are provided on one telescoping friction plate (outside one in the width direction) that faces the rectangular pressure plate 48 and are bent from both the top and bottom edge sections of the long hole toward the outside in the width direction.

Synthetic resin sleeves 58 fit around the rod-shaped member 17a in portions that are positioned on the inside of the friction assemblies 49a, 49b. Rectangular plate shaped flange sections 59 are formed on the outer-circumferential surfaces of the inside-end sections in the width direction of the sleeves 58, and the flange sections 59 engage inside the long tilt holes 15a in the pair of support-plate sections 22a so as to be able to displace only along the long tilt holes 15a. The sleeves 58 are used for sub-assembling the friction assemblies 49a, 49b with the circular ring friction plates 53, tilt friction plates 54 and telescoping friction plates 55 being combined. Cylindrical shaped collars 60 and coil springs 61 are arranged on the inside of the through holes 16a of the pair of held plate sections 21a. The coil springs 61 are elastically compressed between the collars 60 and the flange sections 59. By using this kind of configuration, the friction force that acts between the drive-side cam 27a and driven-side cam 28a is increased.

The driven-side cam 28a, combined with the drive-side cam 27a, forms a cam device 25a. In this example, the driven-side cam 28a is one cam, and functions as a pressing unit. The driven-side cam 28a is made using sintered metal, and is configured so as to have a center hole 30a for inserting the rod-shaped member 17a through, and the overall cam has mostly a rectangular plate shape. A driven-side cam surface 32a, which is an uneven surface in the circumferential direction, is formed on the outside surface (top surface in FIG. 5A) of the driven-side cam 28a.

The driven-side cam surface 32a includes a flat driven-side base surface 35a, driven-side convex sections 36a that have a trapezoidal cross-sectional shape and protrude outward in the width direction from plural locations (four locations in the example in FIGS. 5A and 5B) that are evenly spaced in the circumferential direction of the driven-side base surface 35a.

Driven-side inclined guiding surfaces 39a that are smoothly inclined from the driven-side base surface 35a are formed on the rear-side surface in the locking direction, which is the direction of rotation of the drive-side cam 27a, of both side surfaces in the circumferential direction of the driven-side convex sections 36a when switching to the locked state. Wall-surface shaped driven-side stopper surfaces 62 that are inclined a little are formed on the front-side surfaces in the locking direction of both side surfaces in the circumferential direction of the driven-side convex sections 36a. The inclination of the driven-side stopper surfaces 62 corresponds to the draft angle necessary for removing the driven-side cam 28a from the mold.

Flat tip-end butt sections 63 that exist on a virtual plane that is orthogonal to the center axis of the driven-side cam 28a are formed on the outer-diameter side half sections of the tip-end surfaces 41a that are the top surfaces of the driven-side convex sections 36a, and tip-end concave sections 64 that are recessed a fixed amount in the axial direction compared to the tip-end butt sections 63 are formed on the inner-diameter side half sections of the tip-end surfaces 41a. Therefore, in the locked state, only the tip-end butt sections 63 of the tip-end surfaces 41a are in contact with the tip-end surfaces 40 of the drive-side convex sections 34a. The degree that the tip-end concave sections 64 are recessed more in the axial direction than the tip-end butt sections 63 can be arbitrarily set as long as the condition that the tip-end concave sections 64 do not come in contact with the tip-end surfaces 40a of the drive-side convex sections 34a is satisfied, however, the driven-side convex sections 36a can be about ⅛ to 1/10 the dimension in the axial direction from the driven-side base surface 35a to the tip-end butt sections 63, for example.

Inclined sliding sections 65 are formed on the inner-diameter side half sections of the driven-side inclined guiding surfaces 39a, and inclined concave sections 66 that are recessed in the axial direction compared with the inclined sliding surfaces 65 are formed on the outer-diameter side half sections of the driven-side inclined guiding surfaces 39a. Therefore, as the drive-side cam 27a rotates, only the inclined sliding sections 65 of the driven-side inclined guiding surfaces 39a slide over the drive-side inclined guiding surfaces 38a of the drive-side cam 28a. The inclined concave sections 66 are recessed a fixed amount in the axial direction more than the inclined sliding sections 65 when compared with the same positions in the circumferential direction (portions having the same phase in the circumferential direction). The degree that the inclined concave sections 66 are recessed in the axial direction from the inclined sliding sections 65 can be arbitrarily set as long as the condition that the inclined concave sections 66 do not slide over the drive-side inclined guiding surfaces 38a is satisfied, however, the inclined concave sections 66 can be about ⅛ to 1/10 the dimension in the axial direction of the driven-side convex sections 36a. The inclined sliding sections 65 and the inclined concave sections 66 include convex curved surfaces that are inclined with a curve. Of the edges on both ends in the circumferential direction of the inclined sliding sections 65, the height dimension in the axial direction of the edge of the end on the rear side in the locking direction except for the chamfer sections is equal to the height dimension in the axial direction of the tip-end butt sections 63.

The tip-end butt sections 63 are provided on the outer-diameter side half sections of the tip-end surfaces 41a that are the top surfaces of the driven-side convex sections 36a, and the inclined sliding sections 65 are provided on the inner-diameter side half sections of the driven-side inclined guiding surfaces 39a that are the side surfaces in the circumferential direction. In other words, the tip-end butt sections 63 are arranged further outside in the radial direction than the inclined sliding sections 65. That is, the inclined sliding sections 65 and the tip-end concave sections 64 are adjacently arranged in the circumferential direction on the inner half section in the radial direction of the driven-side cam surface 32a, and the inclined concave sections 66 and the tip-end butt sections 63 are adjacently arranged in the circumferential direction on the outer half section in the radial direction of the driven-side cam surface 32a.

Figure 5A:
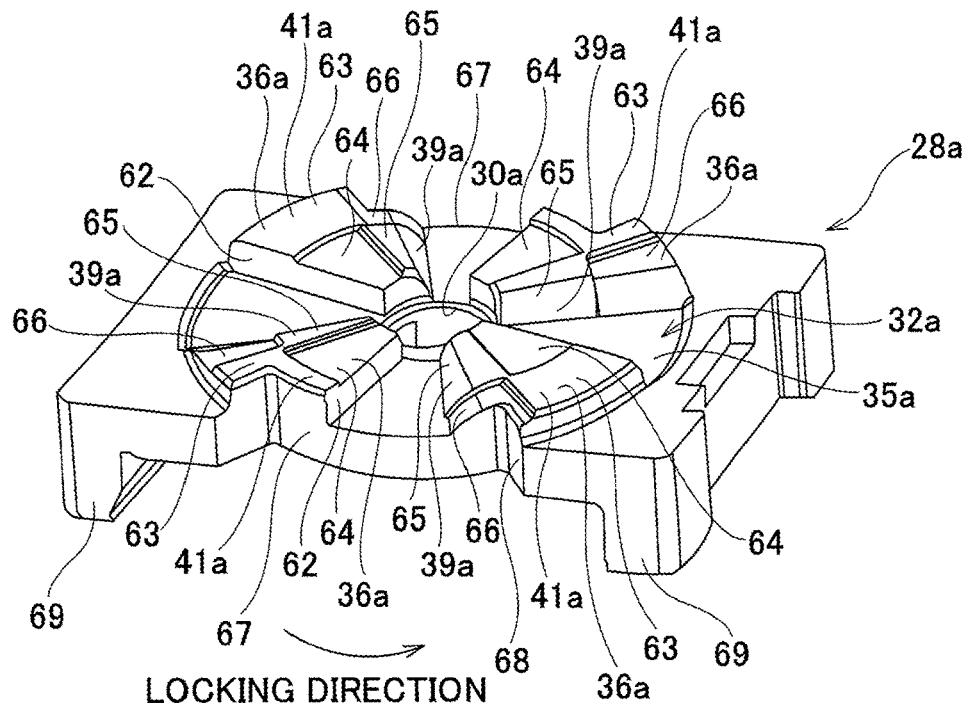
FIG. 5A is a perspective view of a driven-side cam of an example of an embodiment of the cam device of the present invention.
Figure 5B:
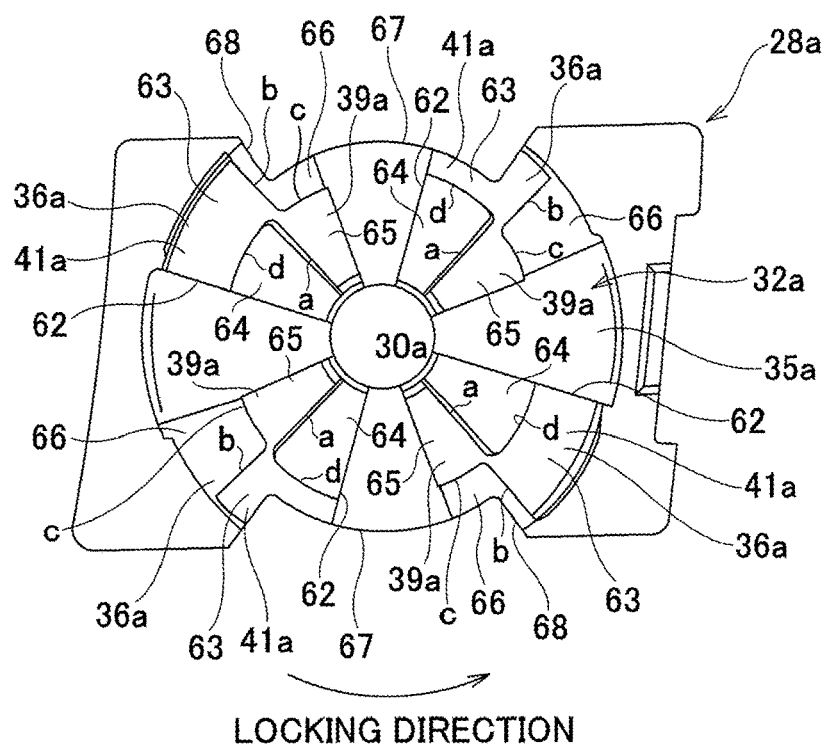
FIG. 5B is a front view of that driven-side cam.

In order to make the tip-end butt sections 63 and the inclined sliding sections 65 smoothly continuous without a stepped section in between, the end edges on the front sides in the locking direction of the edges on both ends in the circumferential direction of the inclined sliding sections 65 (portions indicated by "a" in FIG. 5B) are arranged a little further on the front sides in the locking direction than the end edges on the rear side in the locking direction of the edges on both ends in the circumferential direction of the tip-end butt sections 63 (portions indicated by "b" in FIG. 5B). The outer peripheral edge sections of the inclined sliding sections 65 (portions indicated by "c" in FIG. 5) and the edges of the ends on the rear sides in the locking direction of the edges of both ends in the circumferential direction of the tip-end butt sections 63 (portions indicated by "b" in FIG. 5) are continuous in a state of being bent at nearly right angles, and the end edges on the front sides in the locking direction of the edges of both ends in the circumferential direction of the inclined sliding sections 65 (portions indicated by "a" in FIG. 5) and the inner peripheral edge sections of the tip-end butt sections 63 (portions indicated by "d" in FIG. 5) are continuous in a state of being bent at nearly right angles.

The outer peripheral edge sections of the inclined sliding sections 65 (portions indicated by "c" in FIG. 5) and the inner peripheral edge sections of the tip-end butt sections 63 (portions indicated by "d" in FIG. 5) are arranged on nearly the same single circle, however the outer peripheral edge sections of the inclined sections 65 can be arranged further on the outside in the radial direction than the inner peripheral edge sections of the tip-end butt sections 63. When the outer peripheral edge sections of the inclined sliding sections 65 are arranged further on the outside in the radial direction than the inner peripheral edge sections of the tip-end butt sections 63, it is also possible for the positions in the circumferential direction of the end edges on the front sides in the locking direction of the edges on both sides in the circumferential direction of the inclined sliding sections 65 (portions indicated by "a" in FIG. 5) and the end edge on the rear side in the locking direction of the edges on both sides in the circumferential direction of the tip-end butt sections 63 (portions indicated by "b" in FIG. 5) to match.

When the end edges on the front sides in the locking direction of the edges on both ends in the circumferential direction of the inclined sliding sections 65 (portions indicated by "a" in FIG. 5) are arranged further on the front sides in the locking direction than the end edges on the rear sides in the locking direction of the edges on both ends in the circumferential direction of the tip-end butt sections 63 (portions indicated by "b" in FIG. 5), and the inclined sliding sections 65 and the tip-end butt sections 63 overlap in the radial direction, matching of the height dimensions in the axial direction of the inclined sliding sections 65 and the tip-end butt sections 63 occurs at only one location in the circumferential direction of the overlapping range. Therefore, as the boundary of the positions in the circumferential direction where the height dimensions in the axial direction of the inclined sliding sections 65 and the tip-end butt sections 65, relief sections such as chamfering are provided in portions located on the front sides in the locking direction of the inclined sliding sections 65 and the portions located on the rear sides in the locking direction of the tip-end butt sections 63, and the height dimensions in the axial direction of the tip-end butt sections 63 further on the rear side in the locking direction than the boundary are prevented from becoming higher than the height dimensions in the axial direction of the inclined sliding sections 65, and the height dimensions in the axial direction of the inclined sliding sections 65 that are further on the front side in the locking direction than the boundary are prevented from becoming higher than the height dimensions in the axial direction of the tip-end butt sections 63.

Notch sections 67 that are recessed inward in the radial direction are provided on portions that include concave sections 66 with regard to the circumferential direction at two positions of the outer peripheral edge section of the driven-side cam 28a on opposite sides in the radial direction with a center hole 30a in between. The notch sections 67 are formed so as to span over the pair of driven-side convex sections 36a that are adjacently arranged in the circumferential direction. In other words, one end sections in the circumferential direction of notch sections 67 are such that half sections in the circumferential direction of the tip-end butt section 63 that is formed on one driven-side convex section 36a of the driven-side convex sections 36a is cut away, the middle section in the circumferential direction of the notch section 67 is such that the driven-side base surface 35a that is located between driven-side convex sections 36a is cut away, and the other end section in the circumferential direction of the notch sections 67 is such that a large portion of the inclined concave section 66 that is formed on the other driven-side convex section 36 is cut away. The notch sections 67 are portions for allowing the convex stopper sections 71 that are formed on the drive-side cam 27a to enter. Stopper surfaces 68 that come in contact with the convex stopper sections 71 and prevent the drive-side cam 27a from rotating further in the locking direction are formed on the surfaces on the front sides in the locking direction of the notch sections 67.

A pair of convex engaging sections 69 that protrude inward in the width direction are provided on both end sections in the forward-backward direction of the inside surface of the drives-side cam 28a. Between the pair of convex engaging sections 69, the tilt friction plates 54 of the friction assembly 49b are arranged between the driven-side cam 28a and the one support-plate section 22a, and the driven-side cam 28a is prevented from rotating relative to the friction assembly 49b.

The drive-side cam 27a that together with the driven-side cam 28a forms the cam device 25a corresponds to the other cam. The drive-side cam 27a is made using sintered metal, has a center hole 29a for inserting the rod-shaped member 17a through, and is formed entirely into a circular ring plate shape. A drive-side cam surface 31a, which is an uneven surface in the circumferential direction, is formed on the inside surface (top surface in FIG. 6A) of the drive-side cam 27a.

The drive-side cam 31a includes a flat drive-side base surface 33a, and drive-side convex sections 34a having a nearly trapezoidal shaped cross sections that protrude inward in the width direction from plural locations (four locations in the example in FIG. 6) that are evenly spaced in the circumferential direction of the drive-side base surface 33a.

Drive-side inclined guiding surfaces 38a that are smoothly inclined from the drive-side base surface 33a are formed on the front-side surfaces with regard to the locking direction of both side surfaces in the circumferential direction of the drive-side convex sections 34a. The drive-side inclined guiding surfaces 38a are inclined planes that are linearly inclined, and are formed in the range that spans from the inside end section in the radial direction of the drive-side cam surface 31a to the outside end section. Wall-shaped drive-side stopper surfaces 70 that are inclined a little are formed on the rear-side surfaces with regard to the locking direction of both side surfaces in the circumferential direction of the drive-side convex sections 34a. The inclination of the drive-side stopper surfaces 70 corresponds to the draft angle necessary for removing the drive-side cam 27a from the mold.

Tip-end surfaces 40a that are the top surfaces of the drive-side convex sections 34a are formed into a flat surface shape that is located on a virtual plane that is orthogonal to the center axis of the drive-side cam 27a. The tip-end surfaces 40a are formed in a range that spans from the inside end section in the radial direction of the drive-side cam surface 31a to the outside end section except the portions where the stopper convex sections 71 are provided.

A pair of convex stopper sections 71 that protrude further inward in the width direction than the tip-end surfaces 40a are provided at two locations on opposite sides in the radial direction of the outer-diameter side portion of the drive-side cam 31a with the center hole 29a in between, and in portions that are aligned with the tip-end surfaces 40a in the circumferential direction. By the convex stopper sections 71 entering inside the notch sections 67 that are formed in the outer peripheral edge section of the driven-side cam 28a, and the convex stopper sections 71 coming in contact with the stopper surfaces 68, the drive-side cam 27a is prevented from further rotation in the locking direction. However, in the unlocked state, by the drive-side stopper surfaces 70 coming in contact with the driven-side stopper surfaces 62, the drive-side cam 27a is prevented from further rotation in the unlocking direction.

An engaging protrusion 72 having a non-circular cross-sectional shape and that protrudes outward in the width direction is provided on the outside surface of the drive-cam 27a. By the engaging protrusion 72 engaging with an engaging hole that in formed in the base-end section of the adjustment lever 23a so that relative rotation is not possible, the drive-side cam 27a is able to rotate back-and-forth as the adjustment lever 23a is pivoted back-and-forth. In the example in the figures, the drive-side cam 27a is configured so as to rotate relative to the rod-shaped member 17a based on the operation of the adjustment lever 23a. However, it is also possible to used construction in which the rod-shaped member rotates in synchronization with the drive-side cam.

A thrust bearing 50 that is arranged between the base-end section of the adjustment lever 23a and a nut 52 is configured by a thrust needle bearing that includes a pair of circular ring plate shaped raceway rings, and plural needles that are arranged in a radial shape between the pair of raceway rings. The thrust bearing 50 is such that when the cam device 25a is switched to the unlocked state the dimensions of the parts are set so that there is a gap inside. The thrust bearing 50, in the stage of switching the cam device 25a from the unlocked state to the locked state, or in other words, in the stage of the drive-side inclined guiding surfaces 38a sliding over the driven-side inclined guiding surfaces 39a, is such that the internal gap gradually decreases, and the needles begin to roll, and the rolling of the needles continues until the cam device 25a is in the locked state. That is, by providing the thrust bearing 50, it is possible to reduce the friction force that occurs when switching the cam device 25a from the unlocked state to the locked state, and makes it possible to smoothly perform the rotating operation of the adjustment lever 23a.

In order to set the steering wheel 1a position to an adjustable state, the adjustment lever 23a is pivoted in a specified direction (typically downward), which rotates the drive-side cam 27a in the unlocking direction. Then, by alternatingly arranging the drive-side convex sections 34a and the driven-side convex sections 36a in the circumferential direction, the unlocked state is set in which the dimension in the axial direction of the cam device 25a is reduced, and the space between the driven-side cam 28a as a pressure unit and the rectangular pressure plate 48 as an anchor unit is expanded. As a result, the pressure at the areas of contact between the inside surfaces of the pair of support-plate sections 22a and the outside surfaces of the pair of held plate sections 23a, and the pressure at the fitting area between the outer column 18a and the inner column 19a decreases or is lost. In this state, it is possible to adjust the up-down position and the forward-backward position of the steering wheel 1a within the range that the rod-shaped member is able to move inside the long tilt holes 15a and the through holes 16a.

When adjusting the up-down position of the steering wheel 1a, together with the rod-shaped member 17a, the circular ring friction plates 53 and the telescoping friction plates 55 of the friction assemblies 49a, 49b move in the up-down direction, however, the tilt friction plates 54 do not displace. However, when adjusting the forward-backward position of the steering wheel 1a, the telescoping friction plates 55 move in the forward-backward direction together with the outer column 18a, however, the circular ring friction plates 53 and the tilt friction plates 54 do not displace.

In order to maintain the steering wheel 1a at the adjusted position, after the steering wheel 1a is moved to a desired position, the adjustment lever 23a is pivoted in the opposite direction (typically upward), the drive-side inclined guiding surfaces 38a that are formed on the side surfaces in the circumferential direction of the drive-side convex sections 34a slide over and are guided by the driven-side inclined guiding surfaces 39a that are formed on the side surfaces in the circumferential direction of the driven-side convex sections 36a, and ride up on the driven-side inclined guiding surfaces 39a. Then, by the flat plane shaped tip-end surfaces 40a of the drives-side convex sections 34a coming in contact with the flat plane shaped tip-end surfaces 41a of the driven-side convex sections 36a, the locked state is set in which the dimension in the axial direction of the cam device 25a is increased, and the space between the inside surfaces of the pair of support-plate sections 22a is contracted. In this state, the pressure at the areas of contact between the inside surfaces of the pair of support-plate sections 22a and the outside surfaces of the pair of held plate sections 23a and the pressure at the area of fitting between the outer column 18a and the inner column 19a increases, and the steering wheel 1a is maintained at the adjusted position. The circular ring friction plates 53, the tilt friction plates 54 and the telescoping friction plates 55 are held and sandwiched together, so the force for maintaining the position of the steering wheel 1a in the locked state is increased.

With the steering column device of this embodiment, in the locked state, the drive-side cam 27a is effectively prevented from rotating relative to the driven-side cam 28aa, and it is possible to make the operating force for operating the adjustment lever smooth. In other words, together with providing tip-end butt sections 63 in portions of the outer-diameter side of the tip-end surfaces 41a of the driven-side convex sections 36a that are provided on the driven-side cam 28a, tip-end concave sections 64 that are further recessed in the axial direction than the tip-end butt sections 63 are provided on portions of the inner-diameter side of the tip-end surfaces 41a. Therefore, the cam device 25a is configured so that in the locked state, only the tip-end butt sections 63 that are provided in portions of the outer-diameter side of the tip-end surfaces 41a of the driven-side convex sections 36a come in contact with the tip-end surfaces 40a of the drive-side convex sections 34a of the drive-side cam 27a, and the tip-end convex sections 64 that are provided in portions on the inner-diameter side of the tip-end surfaces 41a of the driven-side convex sections 36a do not come in contact with the tip-end surfaces 40a of the drive-side convex sections 34a. Consequently, the cam device 25a of this embodiment is such that in the locked state, when the drive-side cam 27a tries to rotate relative to the driven-side cam 28a, the distance between the point where the friction force that occurs between the tip-end surfaces 40a of the drive-side convex sections 34a and the tip-end surfaces 41a of the driven-side convex sections 36a acts and the center of rotation of the drive-side cam 27a can be made larger when compared with the conventional construction illustrated in FIG. 11. In this way, when the drive-side cam 27a is rotated relative to the unlocking direction, it is possible to increase the moment force that acts on the drive-side cam 27a in the direction that prevents relative rotation. As a result, in the locked state, it is possible to effectively prevent the drive-side cam 27a from rotating in the unlocking direction relative to the driven-side cam 28a, and it is possible to make the operating force of the adjustment lever smooth. Furthermore, even when an impact is applied to the adjustment lever 23a by mistake, it is difficult for the locked state to become unlocked.

Moreover, together with providing inclined sliding sections on the inner-diameter side portions of the drive side inclined guiding surfaces 39a of the driven-side convex sections 36a, inclined concave sections 66 that are recessed in the axial direction compared to the inclined guiding surfaces 65 are provided on the outer-diameter side portions of the driven-side inclined guiding surfaces 39a. Therefore, the cam device 25a is configured so that when switching from the unlocked state to the locked state, only the inclined sliding sections 65 that are provided on the inner-diameter side portions of the driven-side inclined guiding surfaces 39a can slide over the drive-side inclined guiding surfaces 38a of the drive-side convex sections 34a, and the inclined concave sections 66 that are provided on the outer-diameter side portions of the driven-side inclined guiding surfaces 39a do not slide over the drive-side inclined guiding surfaces 38a. Consequently, the cam device 25a of this embodiment is such that when rotating the drive-side cam 27a in the locking direction relative to the driven-side cam 28a in order to switch from the unlocked state to the locked state, the distance between the point where the friction force that occurs between the drive-side inclined guiding surfaces 38a and the driven-side inclined guiding surfaces 39a acts and the center of rotation of the drive-side cam 27a can be made smaller compared to the case of the conventional construction illustrated in FIG. 11. As a result, when switching from the unlocked state to the locked state, it is possible to reduce the force that is required for relative rotation of the drive-side cam 27a.

The cam device 25a of this embodiment is such that inclined sliding sections 65 and the tip-end butt sections 63 of the driven-side convex sections 36a are provided in a continuous state, so when switching from the unlocked state to the locked state, it is possible to smoothly rotate the drive-side cam 27a relative to the driven-side cam 28a. In other words, a sudden increase in the operating force of the adjustment lever 23a can be prevented, and it is possible to stabilize the operating force of the adjustment lever 23a.

Notch sections 67 having stopper surfaces 68 are provided in portions of the driven-side cam 28a that include the concave sections 66 and essentially do not function as cam surfaces, so together with being able to design the cam device 25a with no waste, it is also possible to reduce the weight of the driven-side cam 28a.

Figure 5C:
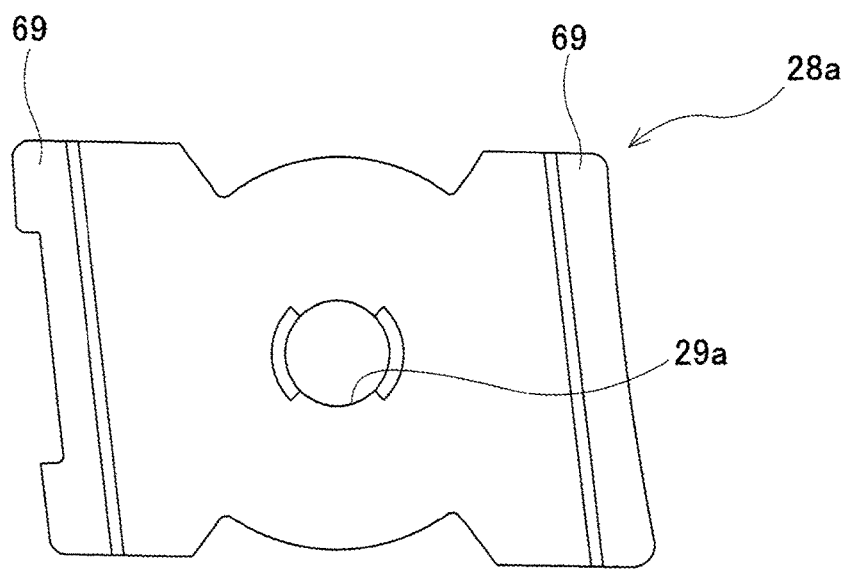
FIG. 5C is a schematic view of the driven-side cam as seen from the rear.
Figure 6A:
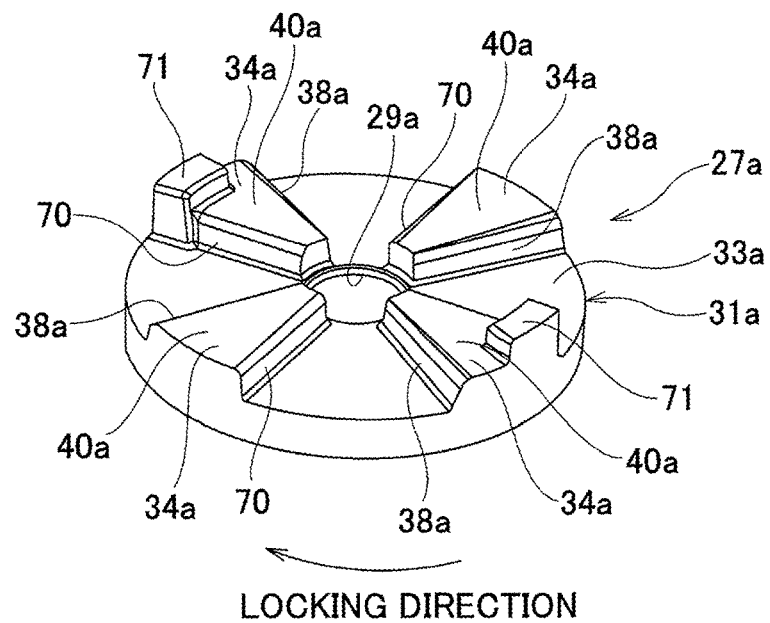
FIG. 6A is a perspective view of a drive-side cam of an example of an embodiment of the cam device of the present invention.
Figure 6B:
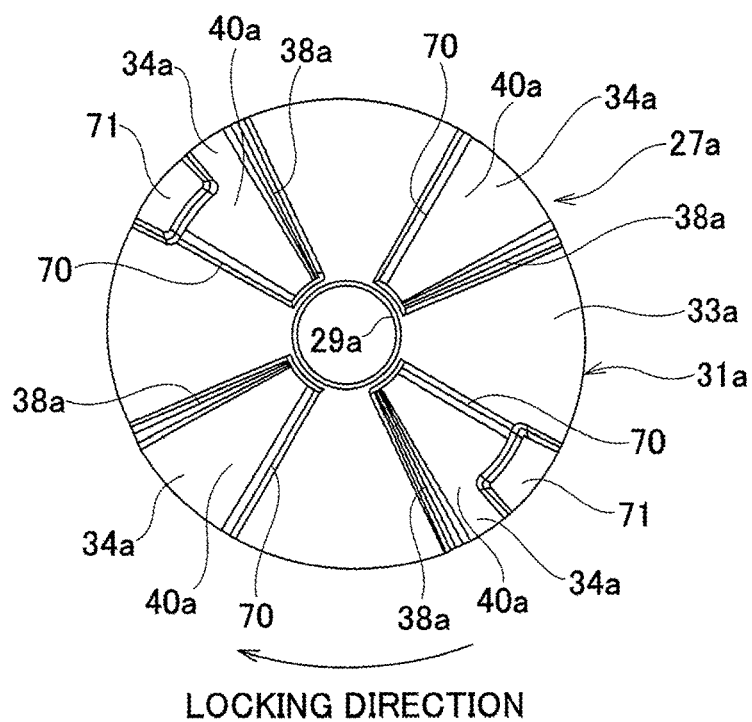
FIG. 6B is a front view of that drive-side cam.
Figure 6C:
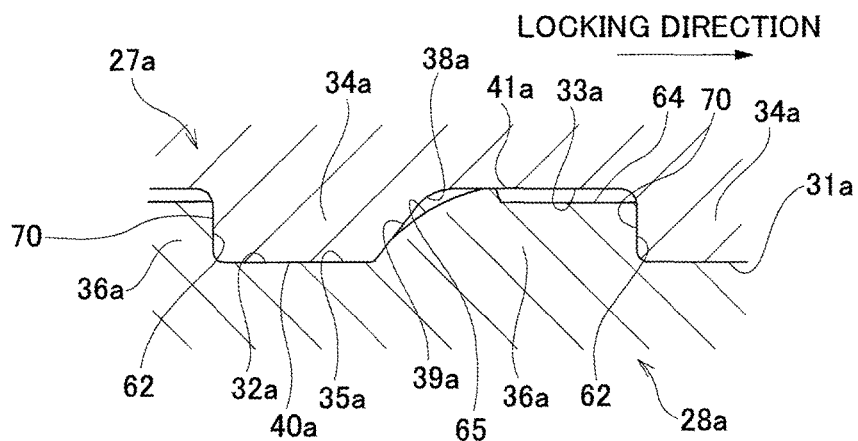
FIG. 6C is a cross-sectional schematic view illustrating the unlocked state of the cam device of the present invention.
Figure 6D:
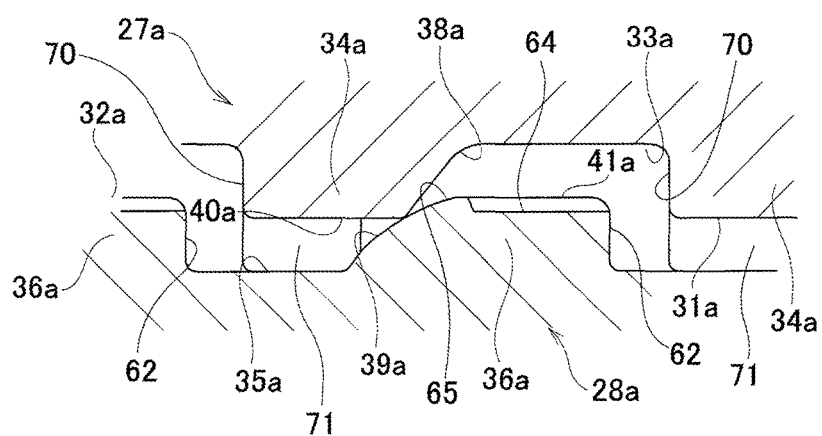
FIG. 6D is a cross-sectional schematic view illustrating the state of switching from the unlocked state to the locked state of the cam device of the present invention.
Figure 6E:
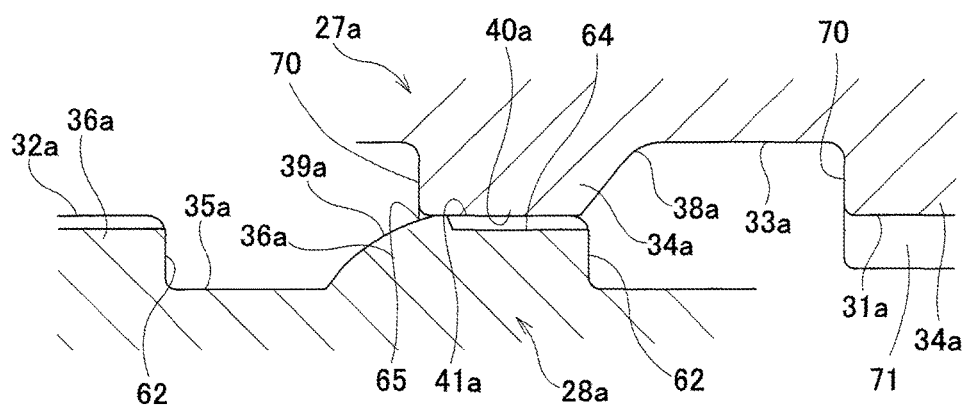
FIG. 6E is a cross-sectional schematic view illustrating the locked state of the cam device of the present invention.
Figure 8:
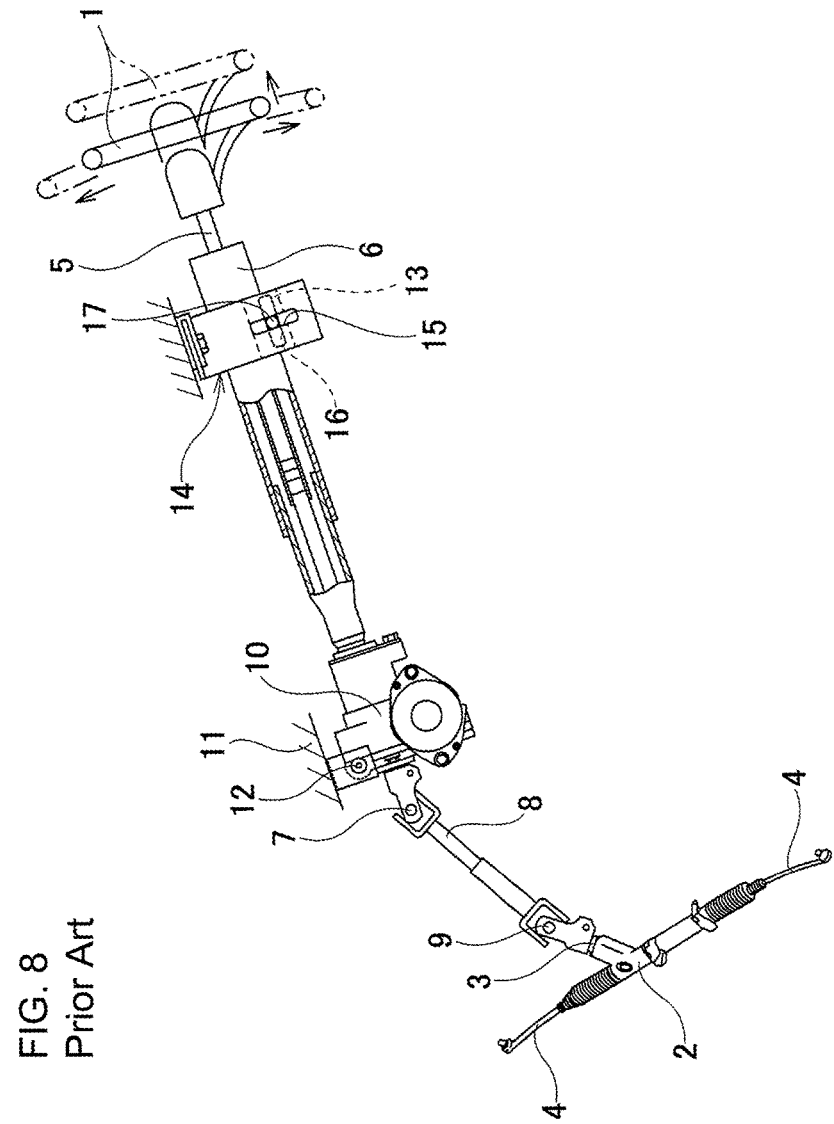
FIG. 8 is a partial side view illustrating a steering device having conventional construction.
Figure 9:
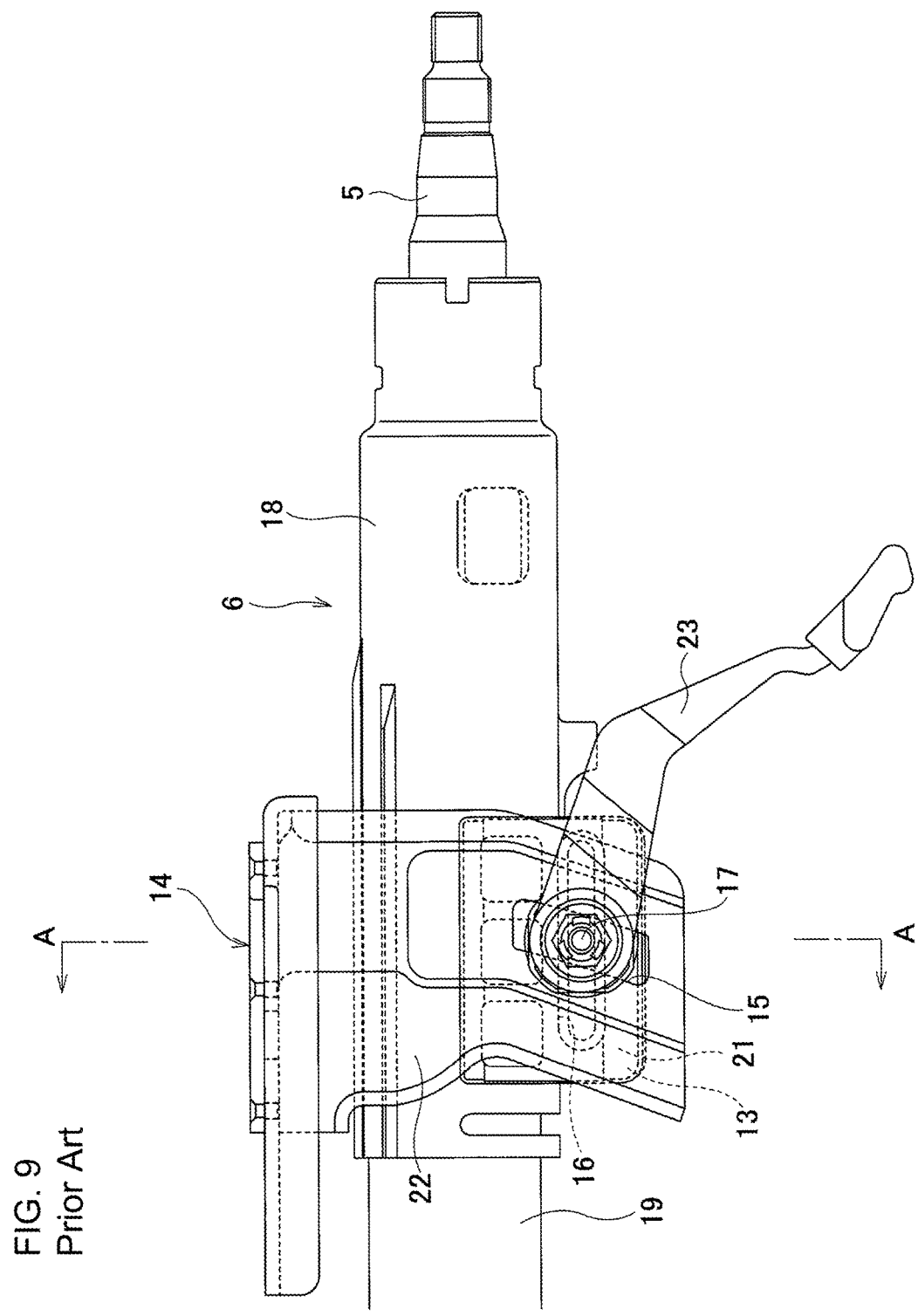
FIG. 9 is a partial side view of a steering wheel position adjustment device having conventional construction.
Figure 10:
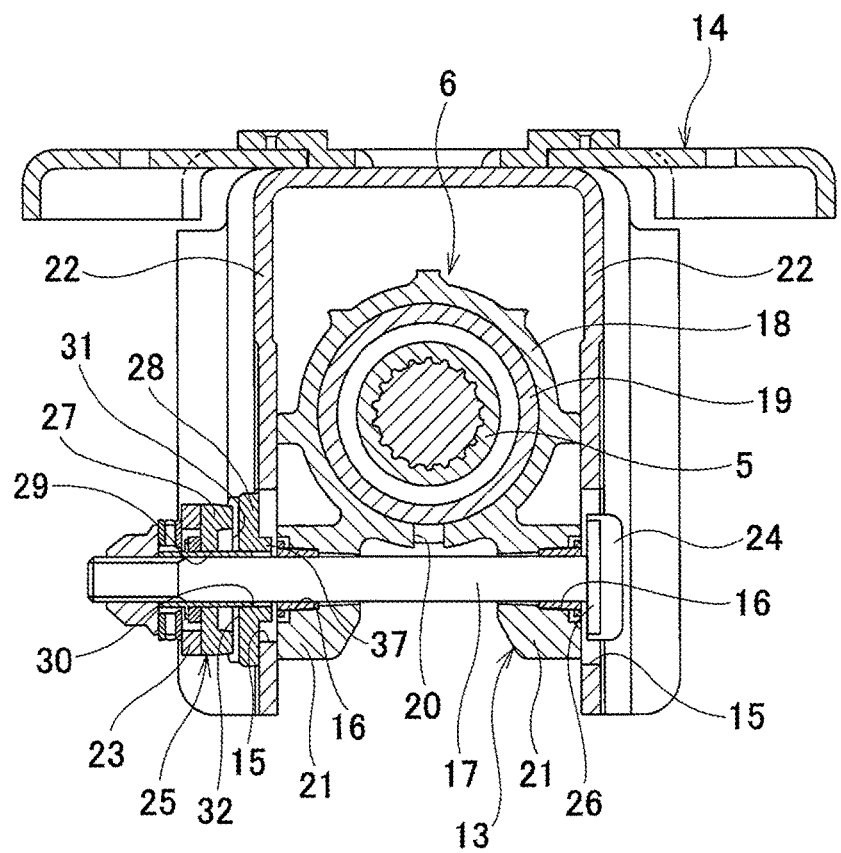
FIG. 10 is a cross-sectional view of section A-A in FIG. 9.
Figure 12A:
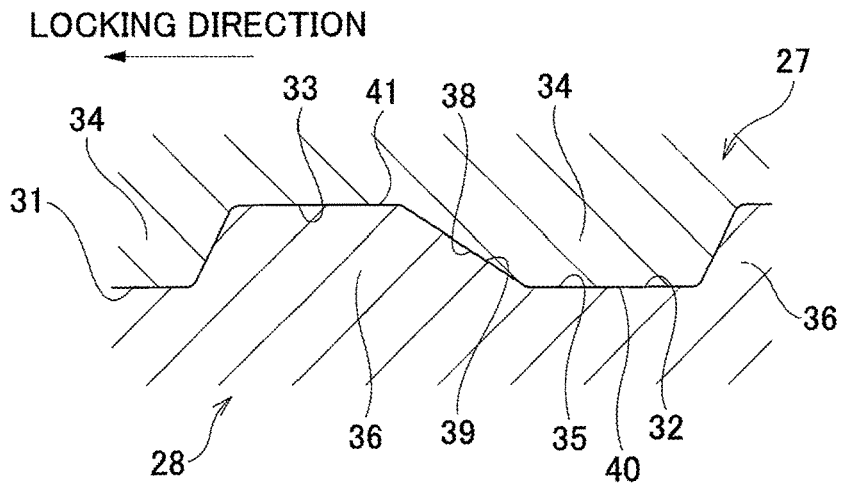
FIG. 12A is a cross-sectional schematic view illustrating the unlocked state of a cam device having conventional construction.
Figure 12B:
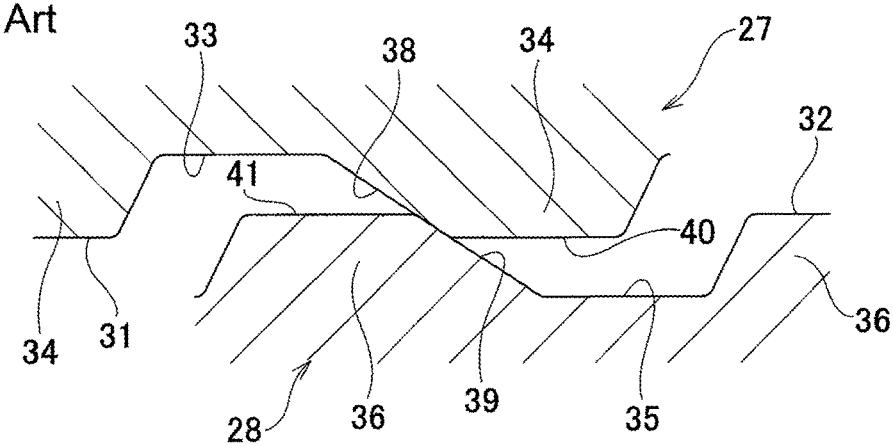
FIG. 12B is a cross-sectional schematic view illustrating the state of switching from the unlocked state to the locked state of a cam device having conventional construction.
Figure 12C:
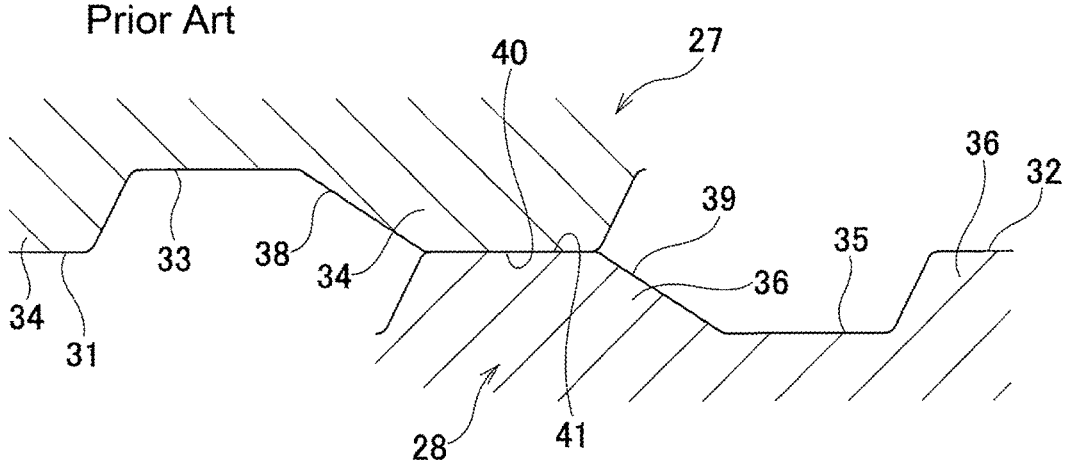
FIG. 12C is a cross-sectional schematic view illustrating the locked state of a cam device having conventional construction.

Three kinds of simulation that were performed in order to confirm the effect of this example of an embodiment will be explained. First, simulation was performed in order to determine what kind of change occurred in the operating force of the adjustment lever between construction as illustrated in FIG. 11 in which the entire tip-end surfaces of the driven-side convex sections were made to be butt surfaces and construction as illustrated in FIG. 5 in which only the outer-diameter side half sections of the tip-end surfaces are made to be butt surfaces by providing tip-end concave sections on the inner-diameter side half sections of the tip-end surfaces of the driven-side convex sections. All of the conditions were the same except for making the shape of the tip-end surfaces of the driven-side convex sections different. As can be clearly seen from the simulation results illustrated in FIG. 7A, in construction in which only the outer-diameter side half sections of the tip-end surfaces of the driven-side convex sections are made to be butt surfaces (solid line $\alpha$), the operating force of the lever increases in the locked state (tightened state), or in other words, relative rotation of the lever becomes difficult, when compared with construction in which the entire tip-end surfaces are made to be butt surfaces (dashed line $\beta$).

Second, simulation was performed to determine what kind of change occurred in the operating force of the adjustment lever between construction as illustrated in FIG. 11 in which the entire driven-side inclined guiding surfaces of the driven-side convex sections were made to be sliding surfaces, and construction as illustrated in FIG. 5 in which only the inner-diameter side half sections of the driven-side inclined guiding surfaces are made to be sliding surfaces by providing inclined concave sections on the outer-diameter side half sections of the driven-side inclined guiding surfaces of the driven-side concave sections. All of the conditions were the same except for making the shape of the different. As can be clearly seen from the simulation results illustrated in FIG. 7B, in construction in which only the inner-diameter side half sections of the driven-side inclined guiding surfaces of the driven-side convex sections are made to be sliding surfaces (solid line $\gamma$), it is possible to reduce the overall operating force of the lever when switching from the unlocked state to the locked state when compared with construction in which the entire driven-side inclined guiding surfaces are made to be sliding surfaces (dashed line $\delta$).

Third, simulation is performed to determine what kind of change occurs in the operating force of the adjusting lever between construction in which of the driven-side convex sections, the entire tip-end surfaces are made to be butt surfaces, and the entire driven-side inclined guiding surfaces are made to be sliding surfaces, and construction as illustrated in FIG. 5 in which of the driven-side convex sections, only the outer-diameter side half sections of the tip-end surfaces are made to be butt surfaces, and only the inner-diameter side half sections of the driven-side inclined guiding surfaces are made to be sliding surfaces. Except for making the shapes of the tip-end surfaces and the driven-side inclined guiding surfaces of the driven-side convex sections different, all of the conditions were the same. As can be clearly seen from the simulation results illustrated in FIG. 7C, in construction in which of the driven-side convex sections, only the outer-diameter side half sections of the tip-end surfaces are made to be butt surfaces and only the inner-diameter side half sections of the driven-side inclined guiding surfaces are made to be sliding surfaces (solid line $\varepsilon$), not only it is possible to reduce the overall operation force of the lever when switching from the unlocked state to the locked state, but it is also possible to increase the operating force of the lever in the locked state and make the overall operating force of the lever smoother (more stable) than in the case of construction in which the entire tip-end surfaces were made to be butt surfaces and the entire driven-side inclined guiding surfaces were made to be sliding surfaces (dashed line $\zeta$).

In this example of an embodiment, construction in which tip-end butt sections are provided on the outer diameter side portions and tip-end concave sections are provided on the inner-diameter side portions of the tip-end surfaces of driven-side convex sections of a driven-side cam was given, however, when embodying the present invention, it is also possible to provide tip-end butt sections on the outer-diameter side portions of the tip-end surfaces of the drive-side convex sections of the drive cam, and provide tip-end concave sections on the inner-diameter side portions of the tip-end surfaces of those drive-side convex sections. Moreover, it is also possible to provide inclined sliding sections and inclined concave sections on the drive-side convex sections of the drive cam, and it is also possible to use construction in which inclined sliding sections and inclined concave sections are not provided.

EXPLANATION OF REFERENCE NUMBERS 1, 1a Steering wheel
2, 2a Steering gear unit 3, 3a Input shaft
4, 4a Tie rod
5, 5a Steering shaft
6, 6a Steering column
7, 7a Universal joint
8, 8a Intermediate shaft
9, 9a Universal joint
10, 10a Housing
11 Vehicle body
12, 12a Tilt shaft
13, 13a Displacement bracket
14, 14a Support bracket
15, 15a Long tilt hole
16, 16a Through hole
17, 17a Rod-shaped member
18, 18a Outer column
19, 19a Inner column
20, 20a Slit
21, 21a Held plate section
22, 22a Support-plate section
23, 23a Adjustment lever
24 Anchor section
25, 25a Cam device
26 First engaging convex section
27, 27a Drive-side cam
28, 28a Driven-side cam
29, 29a Center hole
30, 30a Center hole
31, 31a Drive-side cam surface
32, 32a Driven-side cam surface
33, 33a Driven-side base surface
34, 34a Drive-side convex section
35, 35a Driven-side base surface
36, 36a Driven-side convex section
37 Second engaging convex section
38, 38a Drive-side inclined guiding surface
39, 39a Driven-side inclined guiding surface
40, 40a Tip-end surface
41, 41a Tip-end surface
42 Electric motor
43 Outer shaft
44 Inner shaft
45 Installation plate section
46 Detachment capsule
47 Head section
48 Rectangular pressure plate
49a, 49b Friction assembly
50 Thrust bearing
51 Male threaded section
52 Nut
53 Circular ring friction plate
54 Tile friction plate
55 Telescoping friction plate
56 Fastening pin
57 Fastening pin
58 Sleeve
59 Flange section
60 Collar
61 Coil spring
62 Driven-side stopper surface
63 Tip-end butt section
64 Tip-end concave section
65 Inclined sliding section
66 Inclined concave section
67 Notch section
68 Stopper surface
69 Engaging convex section
70 Drive-side stopper surface

What is claimed is:

1. A cam device having axial and circumferential directions and comprising a drive-side cam rotatably supported, and a driven-side cam unrotatably supported;
the drive-side cam comprising a drive-side cam surface provided on one side surface of the drive-side cam in the axial direction of the cam device, the drive-side cam surface having a drive-side base surface, plural drive-side convex sections protruding in the axial direction from plural locations of the drive-side base surface in the circumferential direction of the cam device and each having first and second side surfaces in the circumferential direction, and plural drive-side inclined guiding surfaces provided on the first side surface of each of the drive-side convex sections;
the driven-side cam comprising a driven-side cam surface provided on one side-surface of the driven-side cam in the axial direction of the cam device, the driven-side cam surface having a driven-side base surface, plural driven-side convex sections protruding in the axial direction from plural locations of the driven-side base surface in the circumferential direction of the cam device and each having first and second side surfaces in the circumferential direction, and plural driven-side inclined guiding surfaces provided on the first side surface of each of the driven-side convex sections;
the drive-side cam being able to rotate relative to the driven-side cam, and a unlocked state in which the drive-side convex sections and the driven-side convex sections are alternatingly arranged in the circumferential direction and a dimension of the cam device in the axial direction of the cam device is contracted, and a locked state in which tip-end surfaces of the drive-side convex sections are brought in contact with tip-end surfaces of the driven-side convex sections and the dimension in the axial direction of the cam device is expanded, being able to be switched, through a state in which the drive-side inclined guiding surfaces slide over the driven-side inclined guiding surfaces;
the cam device further comprising tip-end butt sections provided on outer-diameter side portions of the tip-end surfaces of one convex section of the drive-side convex sections and the driven-side convex sections, and tip-end concave sections that are recessed further in the axial direction than the tip-end butt sections, the tip-end concave sections being provided on inner-diameter side portions of the one convex sections, and
in the locked state, only the tip-end butt sections of the tip-end surface of the one convex sections coming in contact with the tip-end surfaces of other convex sections of the drive-side convex sections and the driven-side convex sections.

2. The cam device according to claim 1, wherein
inclined sliding sections are provided on inner-diameter side portions of one inclined guiding surfaces of the drive-side inclined guiding surfaces and the driven-side inclined guiding surfaces, inclined concave sections that are further recessed in the axial direction than the inclined sliding sections are provided on outer-diameter side portions of the one inclined guiding surfaces, and the tip-end butt sections are provided further outside in a radial direction of the cam device than the inclined sliding sections.

3. The cam device according to claim 2, wherein
the inclined sliding sections and the tip-end butt sections are provided in a continuous state.

4. The cam device according to claim 2, wherein
a notch section that is recessed inward in the radial direction is provided on a portion in at least one location in the circumferential direction of an outer peripheral edge section of one of the drive-side and driven-side cams, the portion including one of the inclined concave sections with regard to the circumferential direction, in the circumferential direction includes the inclined concave sections;

a convex stopper section that protrudes in the axial direction is provided on a portion in at least one location in the circumferential direction of an outer-diameter side portion of the drive-side or driven-side cam surface of the other of the drive-side cam and the driven-side cam, the portion being aligned with one convex sections of the drive-side convex sections and the driven-side convex sections with regard to the circumferential direction; and in the locked state, contact between one side surface in the circumferential direction of the notch section and a side surface in the circumferential direction of the convex stopper section prevents the drive-side cam from rotating any further in a locking direction that is a direction of rotation of the drive-side cam when switching to the locked state.

5. A steering wheel position adjustment device, comprising:
a steering column being pivotally displaceable centered around a tilt shaft arranged in a width direction of the steering column, and supporting on the inside thereof a steering shaft to which a steering wheel is fastened;
a displacement bracket provided in a middle section of the steering column in an axial direction of the steering column;
a support bracket supported by a vehicle body, and having a pair of support-plate sections holding the displacement bracket;
a pair of long tilt holes provided in portions of the pair of support-plate sections aligned with each other, and extending in an up-down direction of the steering column;
a through hole provided in a portion of the displacement bracket and passing through the displacement bracket in the width direction, the portion being aligned with part of the pair of long tilt holes;
a rod-shaped member inserted in the width direction through the long tilt holes and the through holes;
a pressure section provided on a portion of one end section of the rod-shaped member, the portion protruding from an outside surface of a first support-plate section of the pair of support-plate sections;
an anchor section provided on a portion of another end section of the rod-shaped member, the portion protruding from an outside surface of a second support-plate section of the pair of support-plate sections; and
a cam device for expanding and contracting a space between the anchor section and the pressure section; wherein
the cam device is constructed by the cam device of claim 1, such that the driven-side cam functions as the pressure section, and the drive-side cam is supported by the one end section of the rod-shaped member, rotatably centered around the rod-shaped member, with the displacement of the drive-side cam toward one-end side of the rod-shaped member suppressed.

6. The steering wheel position adjustment device according to claim 5, wherein a thrust bearing is provided around the rod-shaped member between a rotating member rotating in synchronization with the drive-side cam or the driven-side cam, and a non-rotating member provided in a position facing the rotating member with regard to an axial direction of the rod-shaped member.

* * * * *